US007983388B2

(12) United States Patent
Michaelsen et al.

(10) Patent No.: US 7,983,388 B2
(45) Date of Patent: Jul. 19, 2011

(54) X-RAY ANALYSIS INSTRUMENT WITH ADJUSTABLE APERTURE WINDOW

(75) Inventors: Carsten Michaelsen, Geesthacht (DE); Stefanie Belgard, Ratzeburg (DE); Juergen Graf, Rosengarten (DE)

(73) Assignee: incoatec GmbH, Geesthacht (DE)

( * ) Notice: Subject to any disclaimer, the term of this patent is extended or adjusted under 35 U.S.C. 154(b) by 146 days.

(21) Appl. No.: 12/461,830

(22) Filed: Aug. 26, 2009

(65) Prior Publication Data

US 2010/0086104 A1 Apr. 8, 2010

(30) Foreign Application Priority Data

Oct. 8, 2008 (DE) ........................ 10 2008 050 851
Jan. 9, 2009 (EP) .................................... 09000179

(51) Int. Cl.
*G01N 23/20* (2006.01)
*G21K 1/04* (2006.01)

(52) U.S. Cl. ........... 378/71; 378/145; 378/147; 378/150

(58) Field of Classification Search .................... 378/71, 378/145, 147, 150, 151, 152, 160, 161
See application file for complete search history.

(56) References Cited

U.S. PATENT DOCUMENTS 3,980,407 A * 9/1976 Hill ................................ 355/71
5,771,270 A * 6/1998 Archer ............................ 378/65
6,041,099 A 3/2000 Gutman
6,226,349 B1 5/2001 Schuster
6,330,301 B1 * 12/2001 Jiang ............................... 378/85
6,807,251 B2 * 10/2004 Okanda et al. .................. 378/71
6,917,667 B2 * 7/2005 Fujinawa et al. ............... 378/70
6,990,177 B2 * 1/2006 Fujinawa et al. ............. 378/149
7,245,699 B2 * 7/2007 Verman et al. .................. 378/85
7,386,097 B2 6/2008 Kerpershoek
7,397,900 B2 * 7/2008 Papaioannou et al. ........ 378/147
7,508,918 B2 * 3/2009 Liu et al. ....................... 378/152
7,511,902 B2 3/2009 Wings
7,651,270 B2 * 1/2010 Kim ............................. 378/205
7,706,503 B2 * 4/2010 Jiang ............................... 378/84

OTHER PUBLICATIONS

M. Schuster, H. Goebel, et al. "Laterally Graded Multilayer Optics for X-Ray Analysis", SPIE Conference on EUV, X-Ray, and Neutron Optics and Sources, Denver, Colorado, Jul. 1999, SPIE vol. 3767, pp. 183-198.

* cited by examiner

*Primary Examiner* — Allen C. Ho
(74) *Attorney, Agent, or Firm* — Paul Vincent

(57) ABSTRACT

An X-ray analysis instrument, in particular, an X-ray diffractometer (21), has an X-ray source (22; SC) that emits an X-ray beam (23), an X-ray optics (24), in particular a multi-layer X-ray mirror, and a collimator mechanism (BM), wherein the collimator mechanism (BM) forms an aperture window (2, 2') with an aperture opening (3, 3') through which at least part (26) of the X-ray beam (23) passes. The collimator mechanism (BM) comprises means for gradual movement of the aperture window (2, 2') in at least one direction (A/B, x, y) transversely to the X-ray beam (23), the aperture opening (3, 3') is at least as large as the cross-section (32) of the X-ray beam (23) at the location of the aperture window (2, 2'), and the path of movement ($VW_x$, $VW_y$) of the aperture window (2, 2'), which is accessible by the collimator mechanism (BM), in the at least one direction (A/B, x, y) is at least twice as large as the extension ($RS_x$, $RS_y$) of the X-ray beam (23) at the location of the aperture window (2, 2') in this direction (A/B, x, y). The X-ray analysis instrument offers a wider scope of beam conditioning possibilities.

16 Claims, 20 Drawing Sheets

1 / 19

X-RAY ANALYSIS INSTRUMENT WITH ADJUSTABLE APERTURE WINDOW

This application claims Paris Convention priority of DE 10 2008 050 851.9 filed Oct. 8, 2008 and EP 09 000 179.3 filed Jan. 9, 2009 the complete disclosures of which are hereby incorporated by reference.

BACKGROUND OF THE INVENTION

The invention concerns an X-ray analysis instrument, in particular, an X-ray diffractometer, comprising

- an X-ray source that emits an X-ray beam,
- an X-ray optics, in particular, a multi-layer X-ray mirror,
- and a collimator mechanism, wherein the collimator mechanism forms an aperture window with an aperture opening through which at least part of the X-ray beam passes.

An X-ray analysis instrument of this type is disclosed e.g. in DE 10 2004 052 350 A1.

X-ray diffractometry is an efficient method for non-destructive chemical analysis of, in particular, crystalline samples. In modern X-ray diffractometers, the X-ray beam that is generated by an X-ray source is directed onto a sample via a multi-layer optics and the diffracted X-ray radiation is analyzed by a detector.

The multi-layer X-ray optics performs monochromatization and mainly shaping of the X-ray beam in an X-ray analysis apparatus with good efficiency. However, the structure of the multi-layer X-ray optics also determines the beam properties on the output side of the multi-layer optics. Physical values such as the input and output convergence, the focal lengths between the source focus and the image focus, the enlargement ratio and thereby also the size of the X-ray beam in the image focus must be determined prior to production of the multi-layer optics. In particular, it is not possible to vary the surface curvature of a multi-layer X-ray mirror or the layer separations in its multi-layers at a later time. For this reason, the multi-layer X-ray optics are basically inflexible.

One particularly important property in X-ray diffractometry is the convergence angle $\beta$, since the resolution of a diffractometer decreases with increasing convergence angle. Convergence collimators have been disclosed for adjustment to varying measurement requirements.

U.S. Pat. No. 7,386,097 describes several holes of identical diameter on a rotatably disposed disc of an X-ray analysis device, which generates a collimator function. A collimator can be continuously moved in a first direction through slight rotation of the disc, and a collimator can be moved in discrete steps in a second direction by changing to a different hole on a different radius of the disc. There are different hole sets with different hole diameters. A similar functionality can be obtained with a band having several holes.

U.S. Pat. No. 7,245,699 B2 discloses a Montel optics with a variable collimator that is mounted thereto, comprising two L-shaped collimator sections one of which can be moved along the angle bisector between the two mirror surfaces.

In both cases, the beam conditioning possibilities are limited. The perforated disc of U.S. Pat. No. 7,386,097 only allows stepped adjustment of the beam divergence (in correspondence with the hole diameter of the different hole sets) and also only stepped collimator shift in one direction. Moreover, the mechanical structure is very complex. The collimator mechanism of U.S. Pat. No. 7,245,699 B2 basically always collimates out a part of the X-ray radiation that is remote from the source.

It is the underlying purpose of the present invention to present an X-ray analysis instrument that offers a greater variety of beam conditioning possibilities in order to thereby improve the field of use of multi-layer X-ray optics.

SUMMARY OF THE INVENTION

This object is achieved by an X-ray analysis instrument of the above-mentioned type which is characterized in that the collimator mechanism comprises means for gradual movement of the aperture window in at least one direction transversely to the X-ray beam, the aperture opening is at least as large as the cross-section of the X-ray beam at the location of the aperture window, and the path of movement of the aperture window, which is accessible by the collimator mechanism, in the at least one direction is at least twice as large as the extension of the X-ray beam in the same direction at the location of the aperture window.

The inventive collimator mechanism enables selection of any portion of the X-ray cross-section with respect to the area ratio at the location of the aperture window by means of the aperture opening, and pass it to a downstream X-ray experiment. In order to adjust the portion of the X-ray beam cross-section, the aperture opening is made to overlap the X-ray beam cross-section in corresponding proportions. If the entire beam cross-section is desired, the aperture opening is adjusted to completely overlap the X-ray beam cross-section. Since the aperture opening is at least as large as the X-ray beam cross-section, the X-ray beam is thereby not collimated at all.

Due to the fact that the aperture window can be moved within a wide range, a partial area of the X-ray beam cross-section can be selected from two opposite sides. The X-ray beam generally has different properties in different regions of its cross-section such that the inventive collimator mechanism also facilitates selection of the properties of the transmitted X-ray beam portion. If the aperture opening is larger than the X-ray beam, VW>=AOE+RS preferably applies in the at least one direction, with VW: path of movement of the aperture window; AOE: extension of the aperture opening; RS: extension of the X-ray beam.

The at least one direction, in which the aperture window can be gradually moved over at least twice the extension of the beam, preferably extends from the portion of the X-ray beam cross-section that is close to the source to the one that is remote from the source. Particularly relevant properties of the transmitted X-ray beam can thereby be influenced.

In one particularly preferred embodiment of the inventive X-ray analysis instrument, the collimator mechanism comprises means for gradual movement of the aperture window in two independent directions transversely to the X-ray beam, and the respective path of movement of the aperture window, which is accessible by the collimator mechanism, in each one of the independent directions is at least twice as large as the extension of the X-ray beam at the location of the aperture window in the respective independent direction.

The collimator mechanism of the design having two independent directions of movement (adjustment possibilities) offers an even greater, almost arbitrary selection of a coherent partial area of the cross-section of an X-ray beam. Towards this end, the aperture opening, which is at least as large as the extension of the X-ray beam, is made to overlap the X-ray beam only to such an extent as is required for the cross-section of the X-ray beam in the subsequent X-ray experiment (typically irradiation of a sample).

For this reason, only part of the aperture opening is penetrated by X-ray radiation in most positions of the aperture window and the remaining part of the aperture opening is not illuminated. The aperture window has a collimating frame of sufficient width around the aperture opening, which completely collimates that part of the X-ray radiation that does not pass the aperture opening.

In a centered (or completely opened) position of movement of the aperture window, the entire X-ray beam can pass through the aperture window, since the aperture opening (if necessary after corresponding adjustment of the window size in case it can be adjusted) is larger than or at least as large as the extension of the X-ray beam at the location of the aperture window.

The path of movement of the aperture window in the embodiment with two independent directions of movement is sufficiently large such that any point on the edge of the aperture collimator can be made to overlap any point on the edge of the cross-section of the X-ray beam (at the location of the aperture window). For this reason, a partial area of the cross-section of the X-ray beam can be selected from any direction. In accordance with the invention, at least VW>=2*RS applies for the two independent directions, with VW: path of movement of the aperture window, and RS: extension of the X-ray beam. In case the aperture opening is larger than the X-ray beam, VW>=AOE+RS preferably also applies for any of the independent spatial directions, with AOE: extension of the aperture opening.

Due to the gradually movable collimator mechanism, the area of the selected (transmitted) partial area of the X-ray beam cross-section can also be gradually selected. In accordance with the invention, this partial area may be selected to have any area portion of between 0% and 100% of the X-ray beam cross-section. It should be noted that the aperture opening can be maintained at a fixed invariable value while the partial area is gradually selected.

A defined partial area of an X-ray beam is selected in accordance with the invention, in particular, in order to improve the data quality of an X-ray diffractive measurement, in particular, a signal-to-noise ratio. The selection of an optimum partial area can be determined, in particular, by means of ray tracing methods, thereby taking into consideration the properties of the (multi-layer) X-ray optics in a simulation, in particular, wherein the distribution of the X-ray flux density over the cross-section of the X-ray beam is calculated, and the effects of selection of different partial areas of the cross-section on the intensity distribution in a detection plane are determined.

The at least one direction or the two independent directions are preferably at least approximately perpendicular with respect to the direction of propagation of the X-ray beam. The two independent directions are moreover preferably at least approximately perpendicular with respect to each other. The "location of the aperture window" relates to the position with respect to the direction of propagation of the X-ray beam.

In a preferred embodiment of the inventive X-ray analysis instrument, the size of the aperture opening cannot be adjusted. An aperture window with fixed aperture opening has a particularly simple and therefore inexpensive construction.

In an alternative advantageous embodiment of the collimator mechanism, the size of the aperture opening can be adjusted, wherein the aperture opening can be adjusted to a size that is at least as large as the cross-section of the X-ray beam at the location of the aperture window. Other selectable sizes of the aperture window are then typically smaller than the cross-section of the X-ray beam. This embodiment offers even greater freedom with respect to selection of the partial area of the X-ray beam cross-section. In particular, it is possible to select partial areas inside the cross-section (i.e. partial areas without edge portion).

In a preferred further development of this embodiment, the collimator mechanism has two oppositely movable L-shaped aperture sections for adjusting the size of the aperture opening. This simple structure has proven to be useful in practice.

In one further preferred embodiment of the inventive. X-ray analysis instrument, the collimator mechanism is disposed on the output side of the X-ray optics. This obtains optimum control of the beam geometry, in particular the beam convergence, on an illuminated sample.

In one particularly preferred embodiment, the aperture window has a square aperture opening, the X-ray beam has an approximately square cross-section at the location of the aperture collimator, wherein the side edges of the square aperture opening and the square cross-section of the X-ray are oriented parallel to each other and the at least one direction in which the aperture window can be moved is oriented along a diagonal of the square aperture opening. In this case, a square partial area of the X-ray beam can be effectively varied in size through movement along only one diagonal. The beam quality also often varies greatly in the direction of the corner areas of a square X-ray beam cross-section, and the above-mentioned arrangement of the paths of movement particularly facilitates access to these corner areas. The at least one direction preferably extends along the diagonal of the X-ray beam cross-section, which maps the portion of the X-ray beam near to the source into that portion remote from the source. When two independent directions of movement are provided, these typically extend along the two diagonals of the square X-ray beam cross-section.

Another preferred embodiment is characterized in that the X-ray optics is disposed in a gas-tight optical housing and the collimator mechanism is disposed in a gas-tight collimator housing, wherein the two housings are evacuated or flooded with a protective gas, or the X-ray optics and the collimator mechanism are disposed in a common gas-tight housing, wherein the common housing is evacuated or flooded with a protective gas. In both cases, the protective gas reduces corrosion and soiling of the surfaces of the X-ray optics and the collimator mechanism as well as air absorption.

In another advantageous embodiment, the means for gradual movement of the aperture window comprise at least one micrometer screw and/or at least one fine thread bolt. These means have proven to be useful in practice. The micrometer screw is particularly advantageous for frequent adjustment of the direction.

In another advantageous embodiment, the collimator mechanism has a holder for an exchangeable aperture window element and the holder can be moved by the means for gradual movement of the aperture window. For this reason, the X-ray analysis means can be easily adjusted to different requirements, in particular spatial extensions of the X-ray beam.

An inventive X-ray analysis instrument can be used, in particular, in X-ray diffractometry to select a part of the X-ray beam by means of the aperture opening of the aperture window and direct it onto a sample in order to improve the reflex separation. The inventive X-ray analysis means permits selection of the portion (or partial area) in a specific and thereby particularly simple and flexible fashion.

The present invention also concerns the application of a collimator mechanism, comprising an aperture window with an aperture opening for selecting a portion of an X-ray beam, wherein the X-ray beam is emitted by an X-ray source and is imaged onto a sample by an X-ray optics, in particular, a multi-layer X-ray mirror, in particular, wherein this application is performed with an inventive X-ray analysis instrument, characterized in that a portion of the X-ray beam on the X-ray optics, which is remote from the source, is selected for adjusting, in particular, reducing the focus size of the X-ray beam at the location of the sample by means of the aperture opening of the aperture window. In accordance with the invention, it has turned out that a portion of an X-ray beam that is remote from the source can yield better data quality, in particular, an improved signal-to-background ratio in X-ray experiments, in particular in X-ray diffraction experiments, on samples that are smaller compared to the overall X-ray beam at the sample location. In particular, scattering on air, on the sample holder or other parts of the X-ray analysis instrument can be reduced by optimizing the focus size. In case of single reflection on the X-ray optics (e.g. a Goebel mirror), the cross-sectional area of the selected portion of the X-ray beam that is remote from the source extends at the location of the aperture window maximally to the center line of the cross-section of the overall X-ray beam in accordance with the invention, wherein this center line divides the X-ray beam at the location of the aperture window into one half close to the source and one half remote from the source (with respect to reflection on the X-ray optics) with respectively identical area portions. In case of double reflection on the X-ray optics (e.g. Montel optics) in accordance with the invention, the selected portion of the X-ray beam that is remote from the source extends maximally to the two center lines of the cross-section of the overall X-ray beam, wherein these center lines divide the X-ray beam at the location of the aperture window, in each case, into one half close to the source and one half remote from the source (with respect to the respective reflection on the X-ray optics) with respectively identical area portions. In other words, the selected portion of the X-ray beam remote from the source then lies in that surface area (typically "quarter") of the X-ray cross-section, with respect to which both reflections on the X-ray optics are to be attributed to the side remote from the source. The portion of the X-ray remote from the source comprises 50% or less, preferably 40% or less of the cross-sectional area of the entire X-ray beam in case of single reflection. In case of double reflection, the portion of the X-ray beam remote from the source typically comprises 25% or less and preferably 20% or less of the cross-sectional area of the entire X-ray beam.

In one preferred variant of the inventive use, the focus size of the X-ray beam is adjusted to the size of the sample at the location of the sample. The signal-to-background ratio can be optimized through (if possible) complete illumination of the sample, i.e. only of the sample. The focus size is adjusted, in particular, through relative positioning of the aperture opening with respect to the X-ray in view of closeness or remoteness with respect to the source (i.e. transversely to the direction of propagation of the X-ray), whereby the focus size at the sample location can also be adjusted when the size of the aperture opening is invariable or when the area of the selected beam cross-section is the same.

In one advantageous variant of the inventive use, the selected portion of the X-ray beam remote from the source has a below-average mean photon flux density compared to the remaining X-ray beam. The reflex separation or the signal-to-background ratio can sometimes be surprisingly improved although the mean flux density in the selected portion is smaller than in the remaining (or also in the entire) X-ray beam compared e.g. to the use of a portion close to the source having a constantly larger mean flux density than the remaining (or also the entire) X-ray beam. The mean flux density in a selected portion of the X-ray beam is determined via the overall (integrated) photon flux in the selected portion divided by the cross-sectional area of the selected portion. The same applies for the remaining X-ray beam.

In another preferred variant of use, the aperture window is positioned in such a fashion that X-ray radiation does not pass through one part of the aperture opening of the aperture window. In other words, only one part of the aperture opening is held into the X-ray beam (or made to overlap the X-ray beam). It is thereby possible to easily select a portion of an X-ray beam cross-section for transmission, which is smaller than the aperture opening, even when the aperture opening is large.

Finally, in a preferred variant of use, the aperture window is disposed in the X-ray beam between the X-ray optics and the sample. This, in turn, realizes good control of the beam geometry, in particular the beam convergence on the illuminated sample.

Further advantages of the invention can be extracted from the description and the drawing. The features mentioned above and below may be used in accordance with the invention either individually or collectively in arbitrary combination. The embodiments shown and described are not to be understood as exhaustive enumeration but have exemplary character for describing the invention.

The invention is illustrated in the drawing and is explained in more detail with respect to embodiments.

DESCRIPTION OF THE PREFERRED EMBODIMENT

The invention concerns an X-ray analysis instrument, in particular, an X-ray diffractometer, with an X-ray source, an X-ray optics, in particular, a multi-layer X-ray mirror, and a variable collimator mechanism.

Multi-layer X-ray optics and their applications in X-ray diffractometry are disclosed e.g. in U.S. Pat. No. 6,226,349 for so-called Goebel mirrors and in U.S. Pat. No. 6,041,099 for Montel mirrors (also called Montel optics). These multi-layer X-ray mirrors use artificially generated multi-layer systems in order to monochromatize and parallelize or focus X-rays for X-ray analytical applications. A parabolically shaped mirror generates a parallel beam and an elliptically shaped mirror generates a focussed beam. The layer period ("d-spacing") of the multi-layers must vary along the mirror in order to meet the Bragg relationship for one single wavelength (e.g. Cu—K-alpha radiation) at any position of the mirror. The mathematical dependence of this layer thickness variation is disclosed in earlier documents (laterally d-spacing graded multilayers, see e.g. M. Schuster et al., Proc. SPIE 3767, 1999, pages 183-198).

Figure 1:
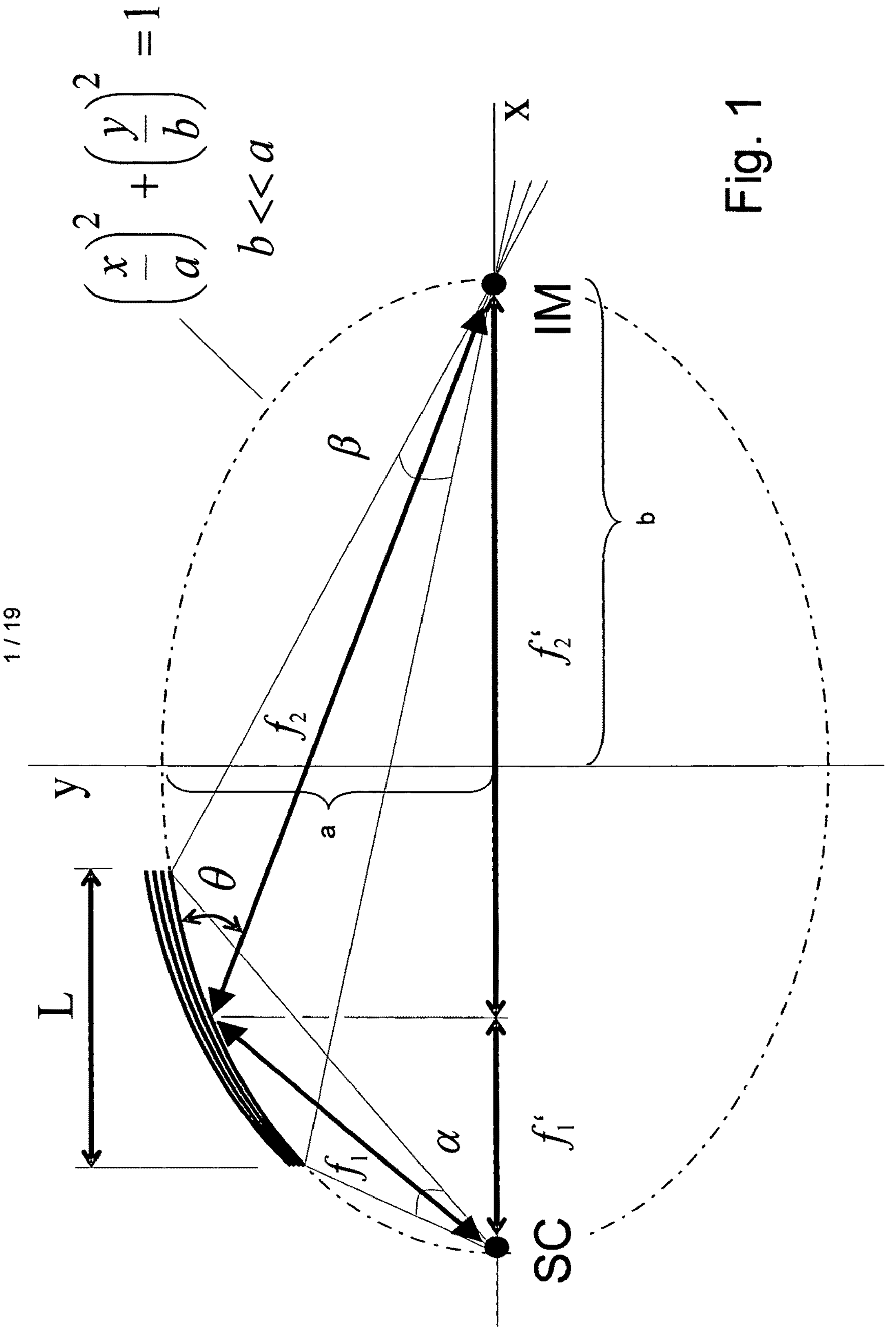
FIG. 1 shows a schematic view of the beam geometry in the area of a multi-layer X-ray optics.

FIG. 1 shows, by way of example, the substantial geometrical values of a focussing (elliptical) Goebel mirror. FIG. 1 shows a Goebel mirror with a length L, a separation f1 from the source SC, a separation f2 from the image focus IM, and semiaxes a and b. $\alpha$ is the light collecting angle and $\beta$ is the convergence (or divergence) of the useful beam. The field of use of the mirrors described in this invention is X-ray diffractometry with typical photon energies >5000 eV. Under these conditions, the Bragg angles $\theta$ for typical Goebel mirrors are in a range of a few degrees such that $b \ll a$ applies. For this reason, f1' is approximately equal to f1 and f2' is approximately equal to f2. The ratio f2/f1 is called the optical enlargement ratio.

Montel optics substantially consist of two Goebel mirrors which are disposed perpendicularly with respect to each other. While Goebel mirrors parallelize or focus the X-ray only in one dimension, Montel mirrors parallelize or focus in two dimensions.

One disadvantage of these X-ray mirrors is that the beam properties on the output side of the mirrors are determined by the design of the optics. In the production e.g. of a focussing Goebel mirror, the physical values such as output convergence, focal lengths between the source and image focus, enlargement and thereby the size of the X-ray in the image focus must be determined prior to production. The values f1, f2, a, b, $\theta$, L, must be fixedly determined prior to production and cannot be varied at a later time. When the requirements are changed, a new mirror type must be produced, which is complex and expensive. For this reason, it cannot be flexibly used for different sample requirements. Other sample requirements must be considered under suboptimal conditions or the optics must be changed, which is expensive and requires considerable modification and complex adjustment of the system. Later bending of the mirror into a different shape is not feasible, since the coating would also have to be changed to meet the Bragg condition, which is generally not possible at a later time.

One substantial beam property is the convergence $\beta$, since the resolution of the diffractometer decreases with increasing $\beta$. The separation of closely neighboring diffraction reflexes of the sample requires that $\beta$ is not excessively large. If the sample requires a higher resolution, the mirror must be changed.

Exchangeable apertures (see U.S. Pat. No. 7,386,097) or an adjustable convergence collimator (see U.S. Pat. No. 7,245,699 B2) were therefore proposed for adjustment to changing measurement requirements. U.S. Pat. No. 7,386,097 substantially describes a Nipkow disc or alternatively movable bands. The production of these components having the required quality is difficult and their structural dimensions are relatively large. Integration in the beam path, that can usually be evacuated in order to protect the optics, or can be flushed with inert protective gas, does not seem to be possible. In U.S. Pat. No. 7,245,699B2, the aperture always consists of a stationary and a movable part. In the design of U.S. Pat. No. 7,245,699 B2, the movable part always only blocks the part of the radiation reflected by the optics, which is remote from the source. In accordance with U.S. Pat. No. 7,245,699 B2, this portion is less efficient than the portion close to the source.

In the above-mentioned conventional devices for limiting the divergence, the beam conditioning possibilities are greatly limited. The aperture disclosed in U.S. Pat. No. 7,245,699 B2 consists of one stationary and one movable component. In particular, it can collimate out only the part of the radiation that is remote from the source. With respect to the alternating apertures in accordance with U.S. Pat. No. 7,386,097, the beam divergence can only be adjusted in steps and not continuously.

It is the underlying purpose of the present invention to increase the field of use of X-ray optics by using an improved very compact collimator mechanism and thereby improve the data quality of X-ray diffractometers in general.

The present invention proposes an X-ray analysis instrument, in particular, an X-ray diffractometer, comprising an X-ray optics and a collimator mechanism that consists of one or more apertures that can all be gradually moved in at least one direction and preferably in two independent directions perpendicularly to the optical axis, and the paths of movement of which are at least twice as large as the X-ray beam emitted from the X-ray optics such that any feasible portion of the X-ray beam emitted from the X-ray optics can be used to illuminate the sample. The collimator mechanism preferably has at least one completely opened position. The collimator mechanism is preferably mounted on the output side of the X-ray optics.

The inventive construction is easy to operate compared to prior art, has a compact construction and is therefore inexpensive to produce but offers substantial flexibility with regard to the field of use of X-ray optics and also extremely simple and reproducible handling. It can even be completely integrated in existing optical housings that can be evacuated e.g. in correspondence with U.S. Pat. No. 7,511,902. This is explained in more detail below.

Figure 2:
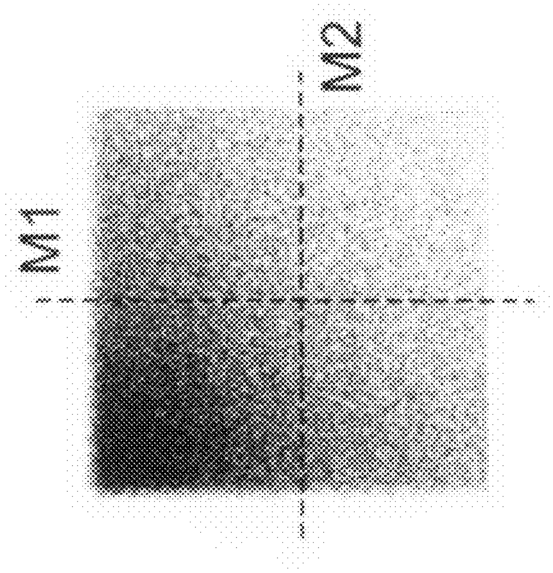
FIG. 2 shows a beam profile perpendicularly to the direction of propagation of an X-ray beam on the output side of a Montel optics, calculated by means of ray-tracing.

A ray tracing program that was optimized for X-ray optics was developed in accordance with the present invention. Comparisons with experiments showed that this ray tracing program produces excellent exact predictions. The inventors found out through such ray tracing calculations that the beam profile on the output side of typical X-ray mirrors is often not homogeneous with respect to intensity. FIG. 2 shows the intensity profile of a 150 mm long multi-layer Montel mirror determined by ray tracing. The areas of high intensity are dark and the areas of low intensity are bright. FIG. 2 shows that the square beam profile is not homogeneously filled with intensity but is particularly dark (and therefore has a great intensity) in the upper left-hand corner. The beam area of great intensity on the upper left-hand side in FIG. 2 was reflected twice, each time by a section of the Montel mirror close to the source, and the beam area of lower intensity on the lower right-hand side was reflected twice, each time by a section of the Montel mirror remote from the source. The two center lines M1 and M2 that are indicated with dashed lines divide the area of the cross-section of the X-ray beam into one half close to the source and one half remote from the source with respect to each of the two reflections. A beam portion of the X-ray beam close to the source (with respect to both reflections) can be selected from the quadrant on the upper left-hand side and a portion remote from the source (with respect to both reflections) can be selected from the quadrant on the lower right-hand side. It should be noted that beam portions of the quadrants on the upper right-hand and lower left-hand sides were reflected once close to the source and once remote from the source. The graininess in FIG. 2 is due to the fact that the number of beams in the ray tracing program is finite.

Figure 4:
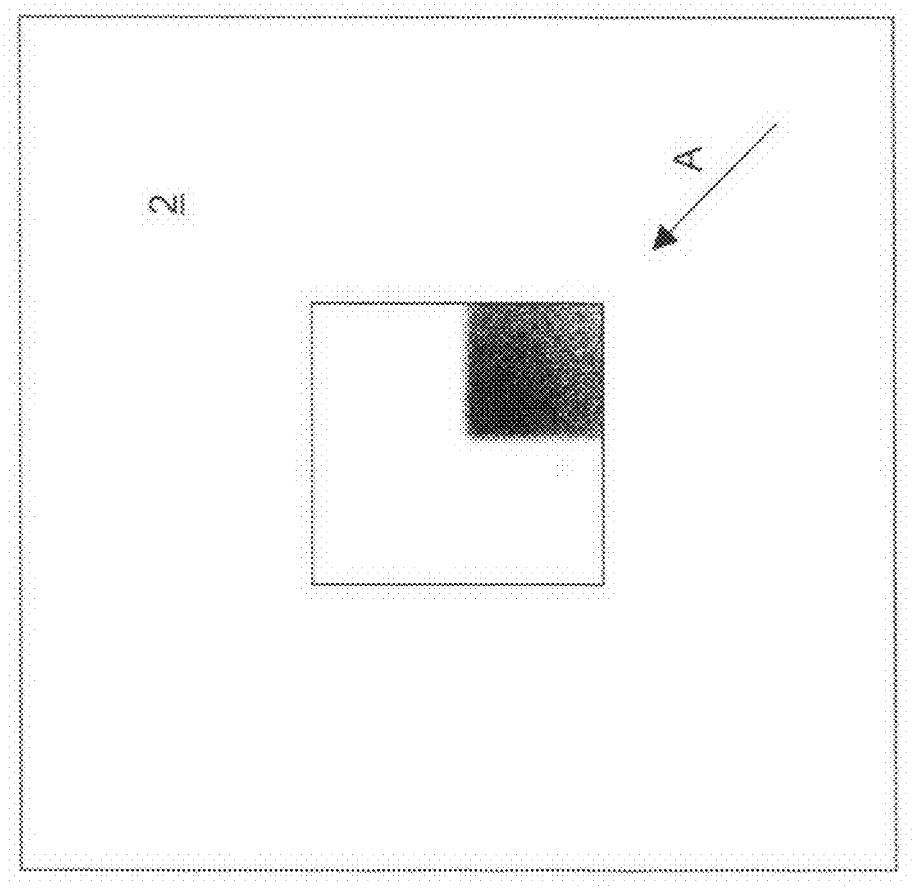
FIG. 4 shows the beam profile of FIG. 3, wherein the aperture opening was shifted in the diagonal direction A.
Figure 5:
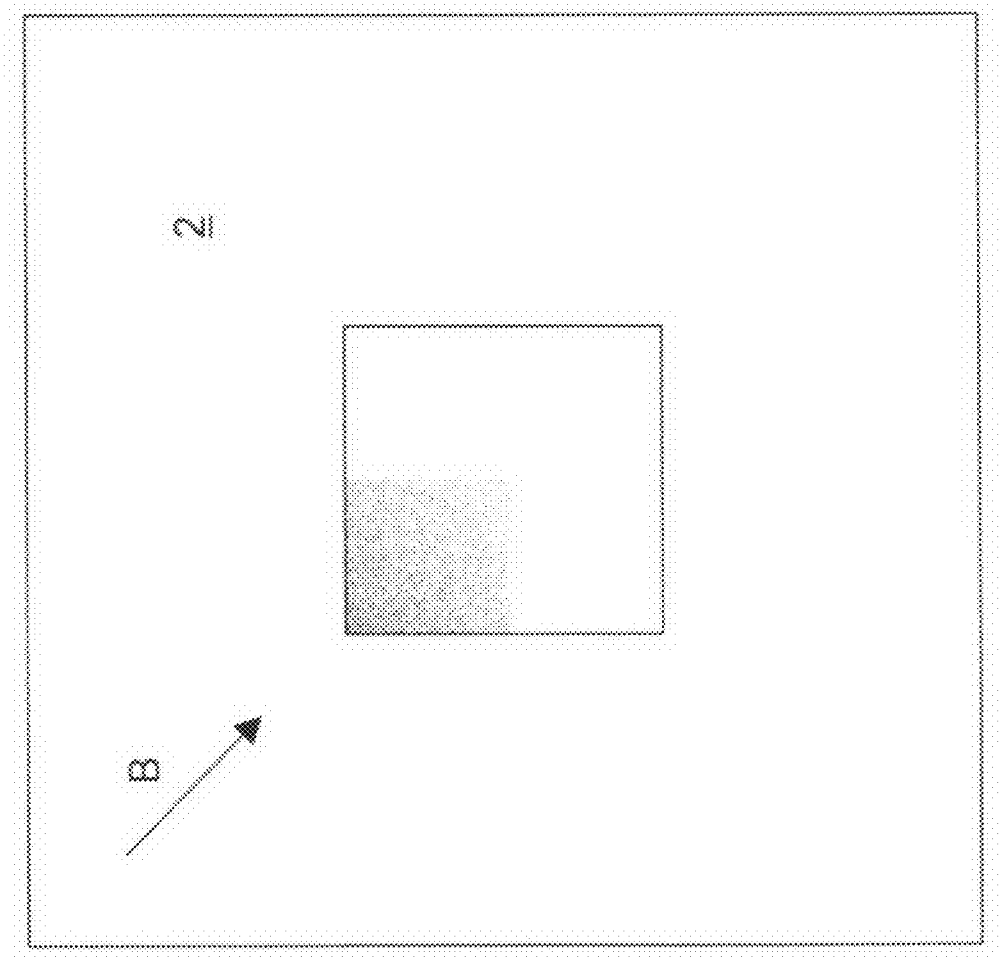
FIG. 5 shows the beam profile of FIG. 3, wherein the aperture opening was shifted in the diagonal direction B.

On the basis of FIG. 2, it seems at first glance to be advantageous to use the particularly dark portion in the upper left-hand corner of the beam for illuminating the sample as shown in FIG. 4, and collimate out the rest of the beam, in case that part of the beam shall be collimated out e.g. in order to reduce the divergence. This corresponds to the procedure according to prior art as disclosed in U.S. Pat. No. 7,245,699 B2. The upper left-hand corner obviously contains the portion that is particularly efficient in accordance with U.S. Pat. No. 7,245,699 B2. The inventors have observed further unexpected effects through ray tracing calculations and subsequent experimental investigations, which attaches greater importance to the use of other parts than proposed in U.S. Pat. No. 7,245,699 B2 or than possible in accordance with U.S. Pat. No. 7,245,699 B2, e.g. of the lower right-hand part of the beam as sketched in FIG. 5. In order to be able to move the collimator (with respect to the at least one direction of movement) into a completely closed position, the path of movement of the collimator must be at least twice as large as the X-ray beam that emerges from the X-ray optics.

Figure 3:
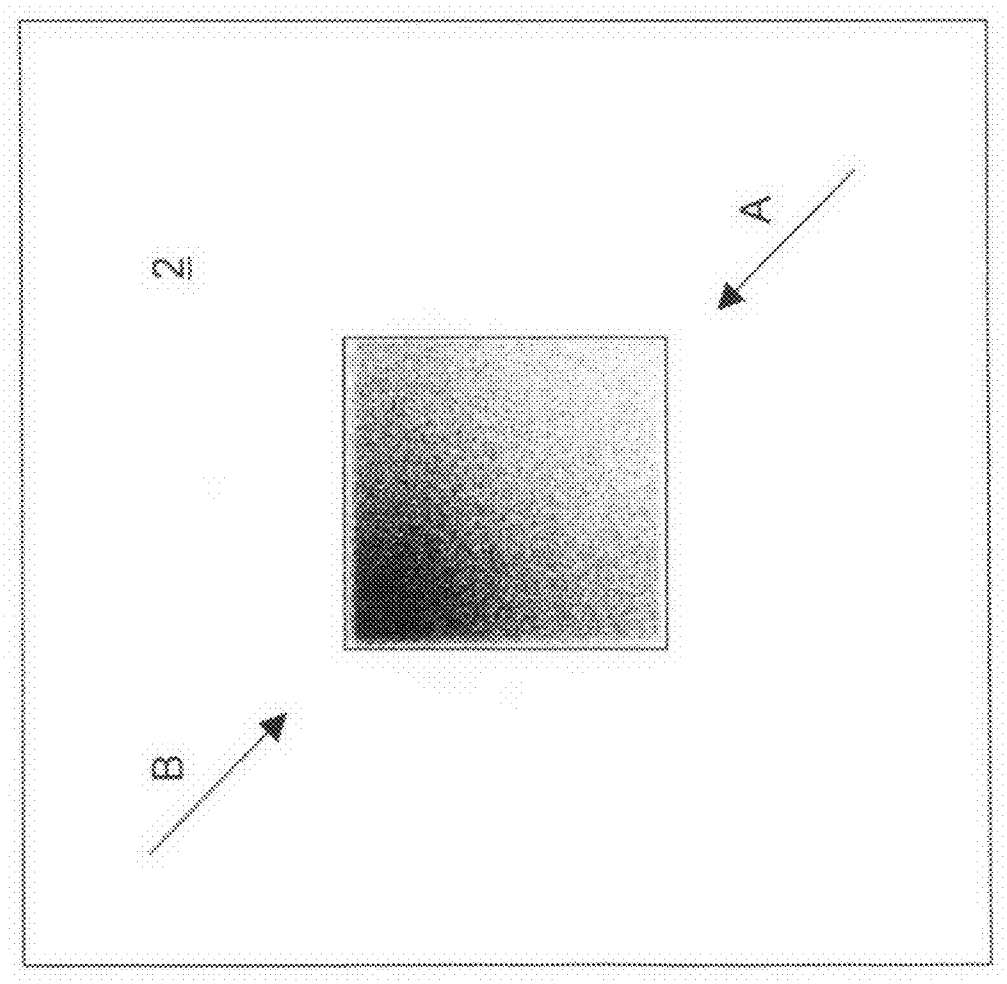
FIG. 3 shows the beam profile of FIG. 2 with inserted aperture window of an inventive X-ray analysis instrument with centered aperture opening.
Figure 6:
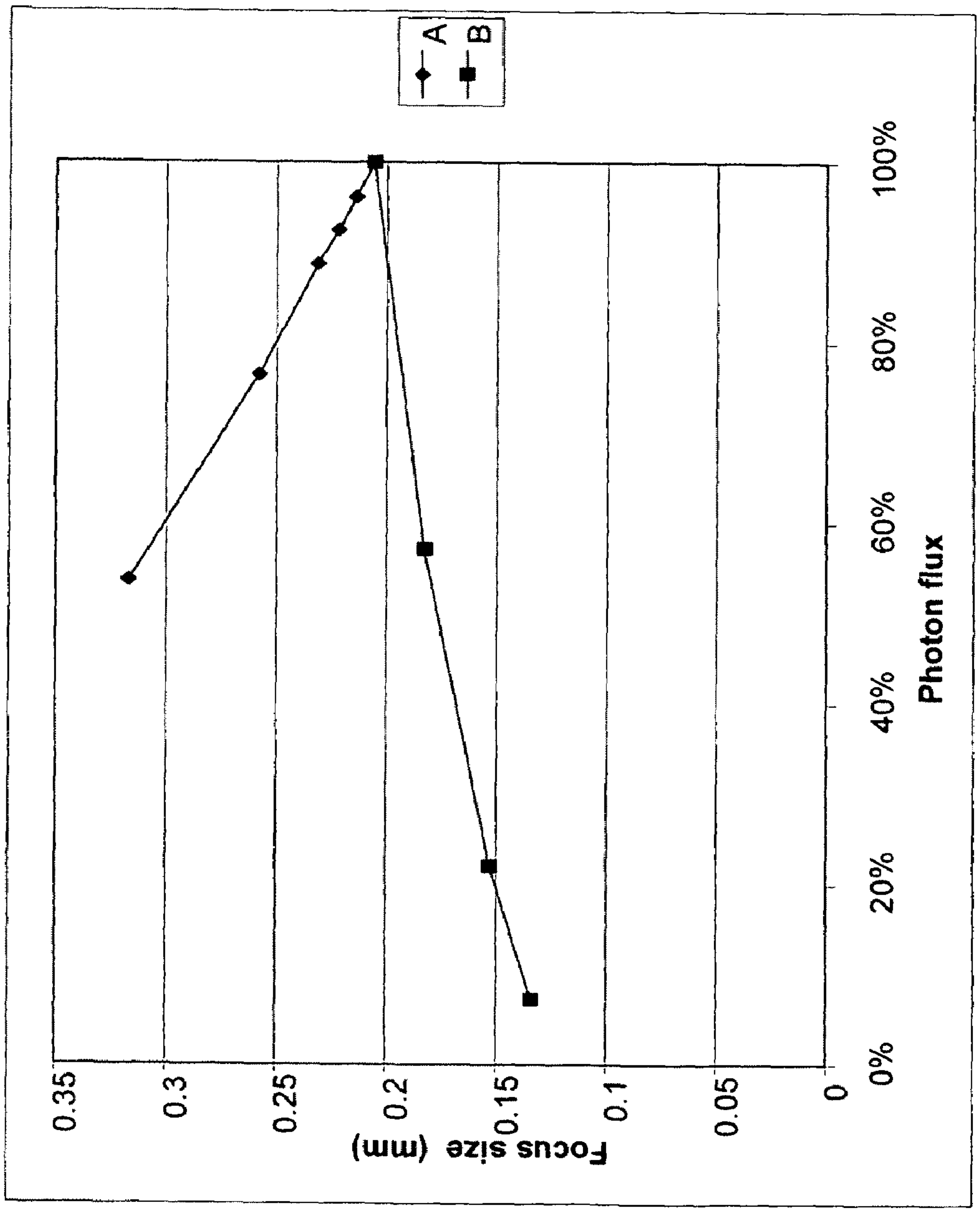
FIG. 6 shows a diagram of the focus size as a function of the photon flux for different positions of movement of the aperture window of FIG. 3.
Figure 7:
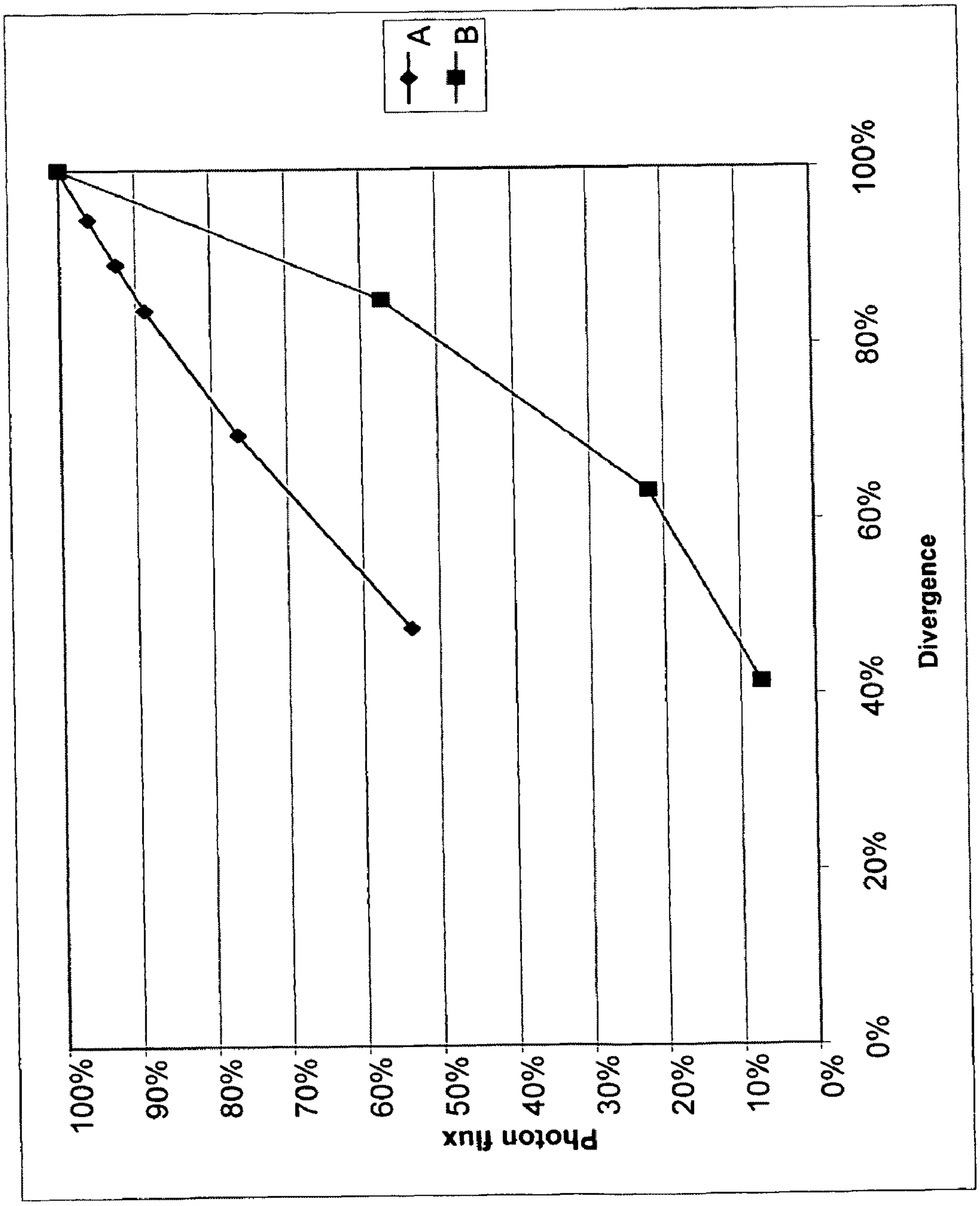
FIG. 7 shows a diagram of the photon flux as a function of the beam divergence for different positions of movement of the aperture window of FIG. 3.
Figure 8:
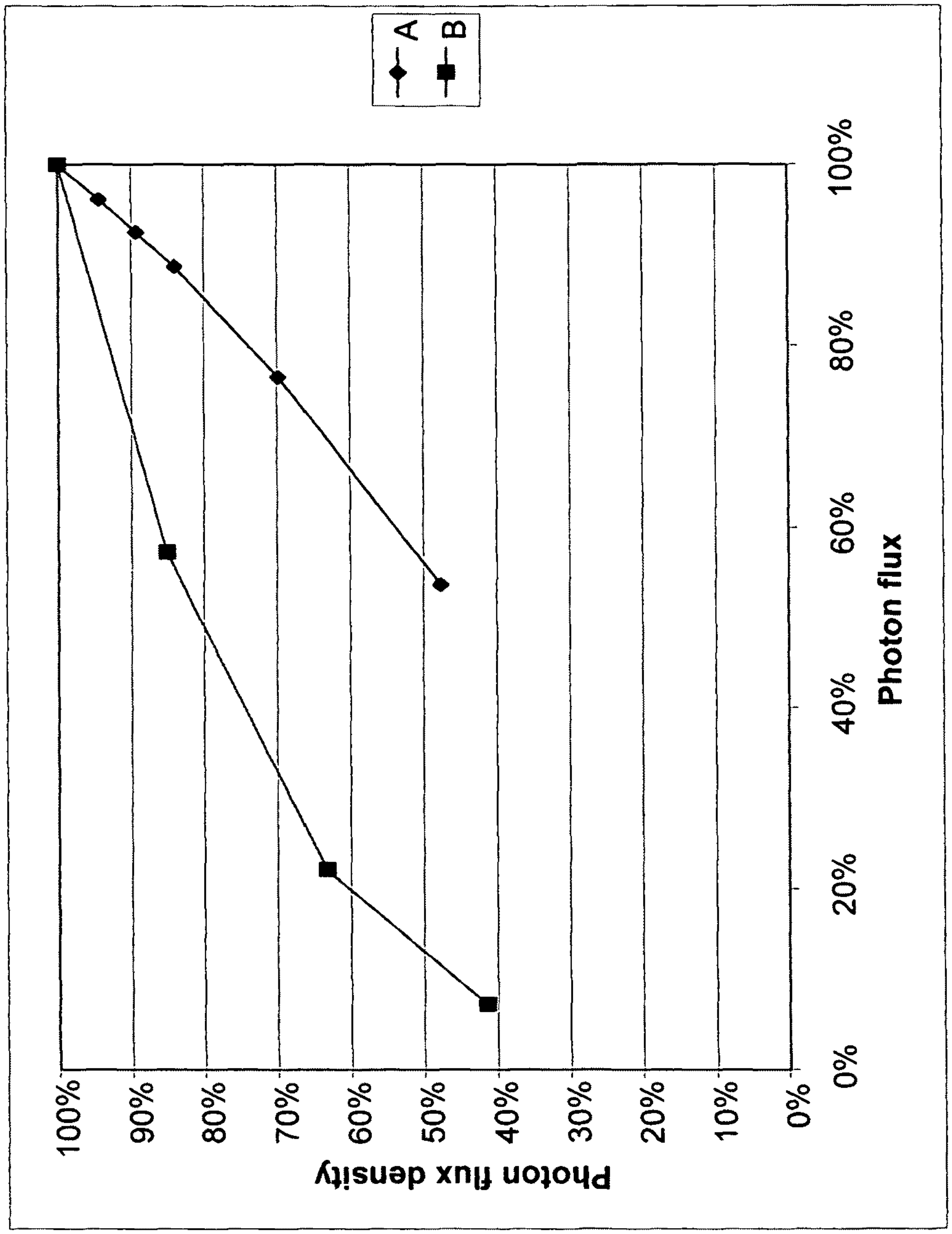
FIG. 8 shows a diagram of the photon flux density as a function of the photon flux for different positions of movement of the aperture window of FIG. 3.
Figure 9:
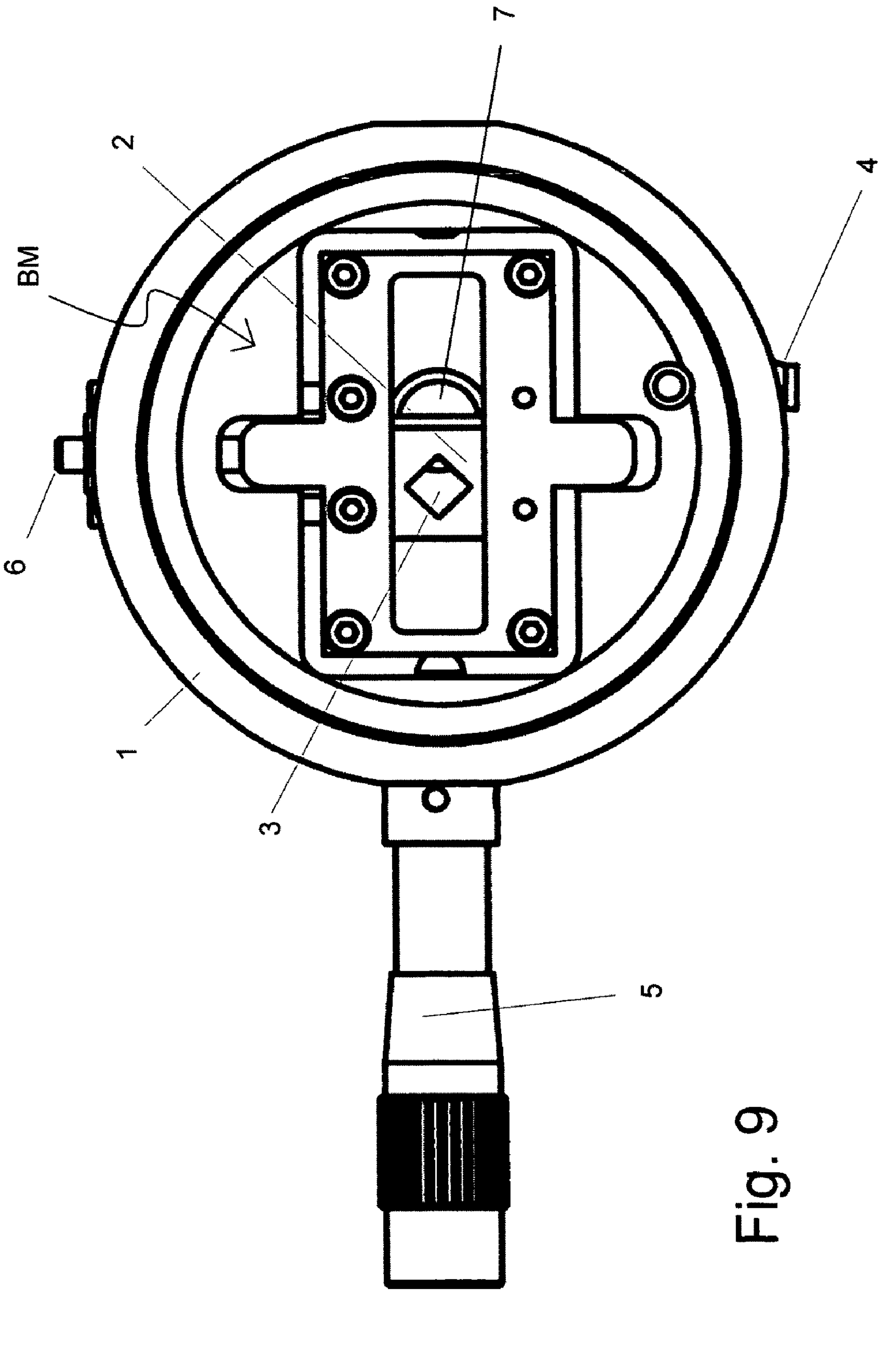
FIG. 9 shows a schematic front side view of a completely mounted collimator mechanism of an inventive X-ray analysis instrument.
Figure 10:
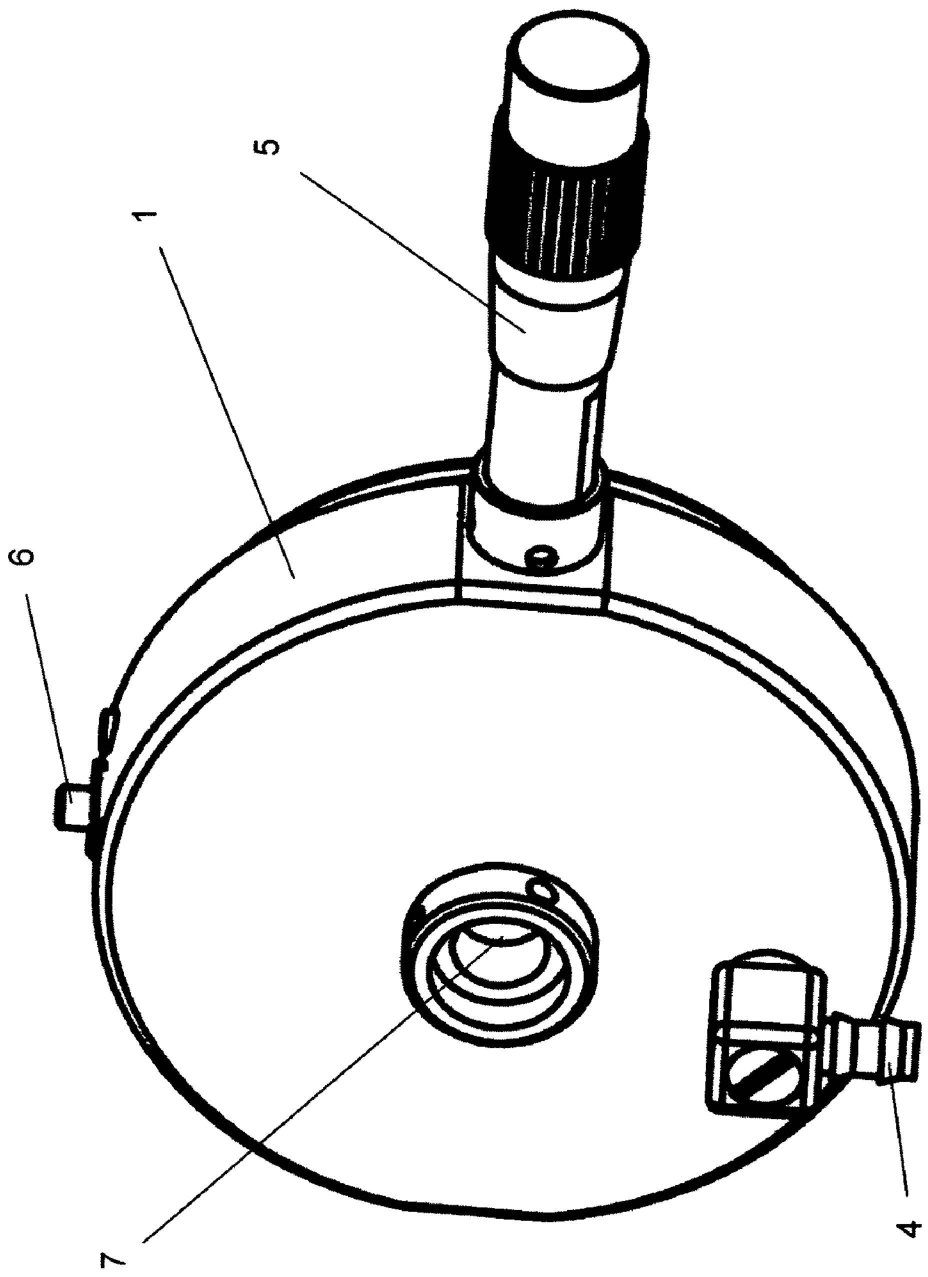
FIG. 10 shows a schematic inclined rear view of the collimator mechanism of FIG. 9.

The following illustrations show that for ray tracing calculations a square collimator (aperture window 2) (sketched in FIGS. 3 through 5) was gradually moved either in the direction A or direction B, and the beam properties were subsequently determined. The determined beam properties are shown in FIGS. 6 through 8. It should be noted that the directions A and B are diametrically opposite. In accordance with the invention, the pair of directions A/B therefore represent together only one direction of movement (possible movement) of the aperture window 2 transversely to the X-ray beam. The effect of the path of movement A corresponds to prior art according to U.S. Pat. No. 7,245,699 B2. The path of movement B cannot be performed or is not provided in accordance with the design of U.S. Pat. No. 7,245,699 B2, since it comprises the supposedly less efficient beam portion. At 100% on the x axis in FIG. 6, the collimator is in the completely opened position. In the illustrated exemplary optics, the beam size at the focus is approximately 0.2 mm when the collimator is completely opened. When the collimator is moved, one can see that the beam increases by moving in the direction A, and decreases by moving in the direction B. This consequently offers the possibility to vary the beam size and adjust it to the sample size through selection of the direction of movement. This is extremely interesting for applications in single-crystal diffractometry for determining the structure of proteins and small organic molecules, wherein the samples often have a size in a range between 0.1 to 0.3 mm. The optimum beam dimension that only irradiates the sample can be adjusted through suitable selection of the direction of movement of the collimator. When the sample is smaller than 0.2 mm, it is possible to eliminate the rays that do not impinge on the sample but only cause air scattering, thereby increasing the background in the diffraction measurement. When the sample is larger than 0.2 mm, the beam can be enlarged through direction of movement A such that the sample is illuminated in a homogeneous fashion, which is also advantageous for the measurement.

FIG. 7 shows that the direction of movement A is advantageous for reducing the divergence while the flux (photons/sec) remains as high as possible.

FIG. 8 shows that the direction of movement B is advantageous when the flux density (photons/sec/$mm^2$) shall remain as high as possible.

These results show that different directions of movement of the collimator change the beam properties in different ways and thereby increase the flexibility for optimizing the beam properties with changing measurement requirements.

FIGS. 6 through 8 can simultaneously be used as calibration curves for movement of the collimator. All three curves deliberately contain the flux in the form of the x or y axis but not the path of movement of the collimator. The exact spatial position of the X-ray beam may not be exactly known and may also change through readjustment of the optics or through other circumstances. The flux on the output side of the collimator can be very easily measured e.g. by means of a photo diode. When the collimator is moved e.g. in the direction A until the flux is halved, the resulting beam size, divergence and flux density can be readily deduced from FIGS. 6 through 8. Conversely, it shows how far the flux must be reduced in order to adjust a certain divergence.

In addition to the illustrated directions of movement A and B diagonally through the square beam, other beam cross-sections, directions of movement (or pairs of directions of movement) and positionings of the collimator are clearly also possible.

Figure 11:
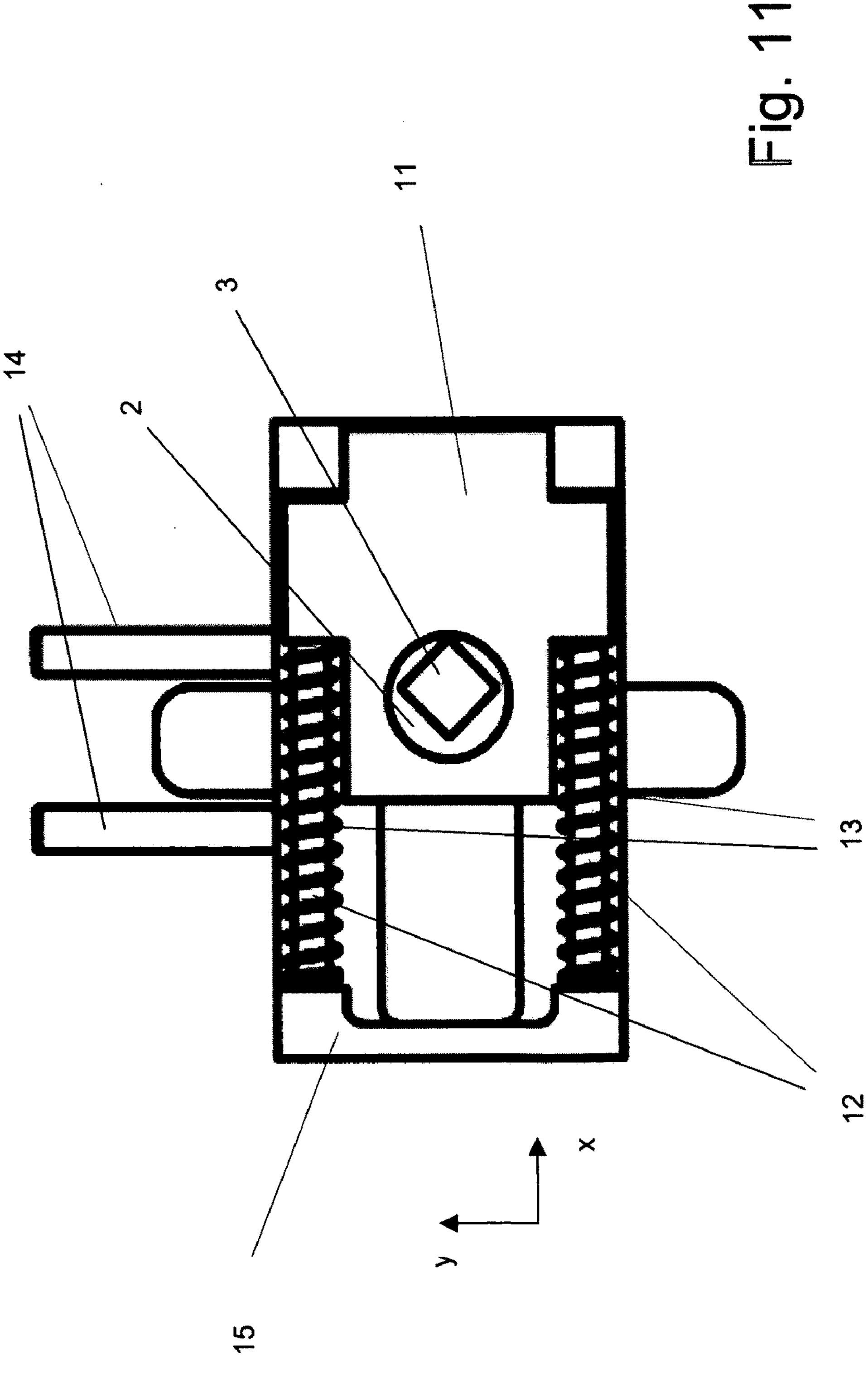
FIG. 11 shows a schematic view of the collimator mechanism of FIG. 9 without housing and adjusting screws.
Figure 12:
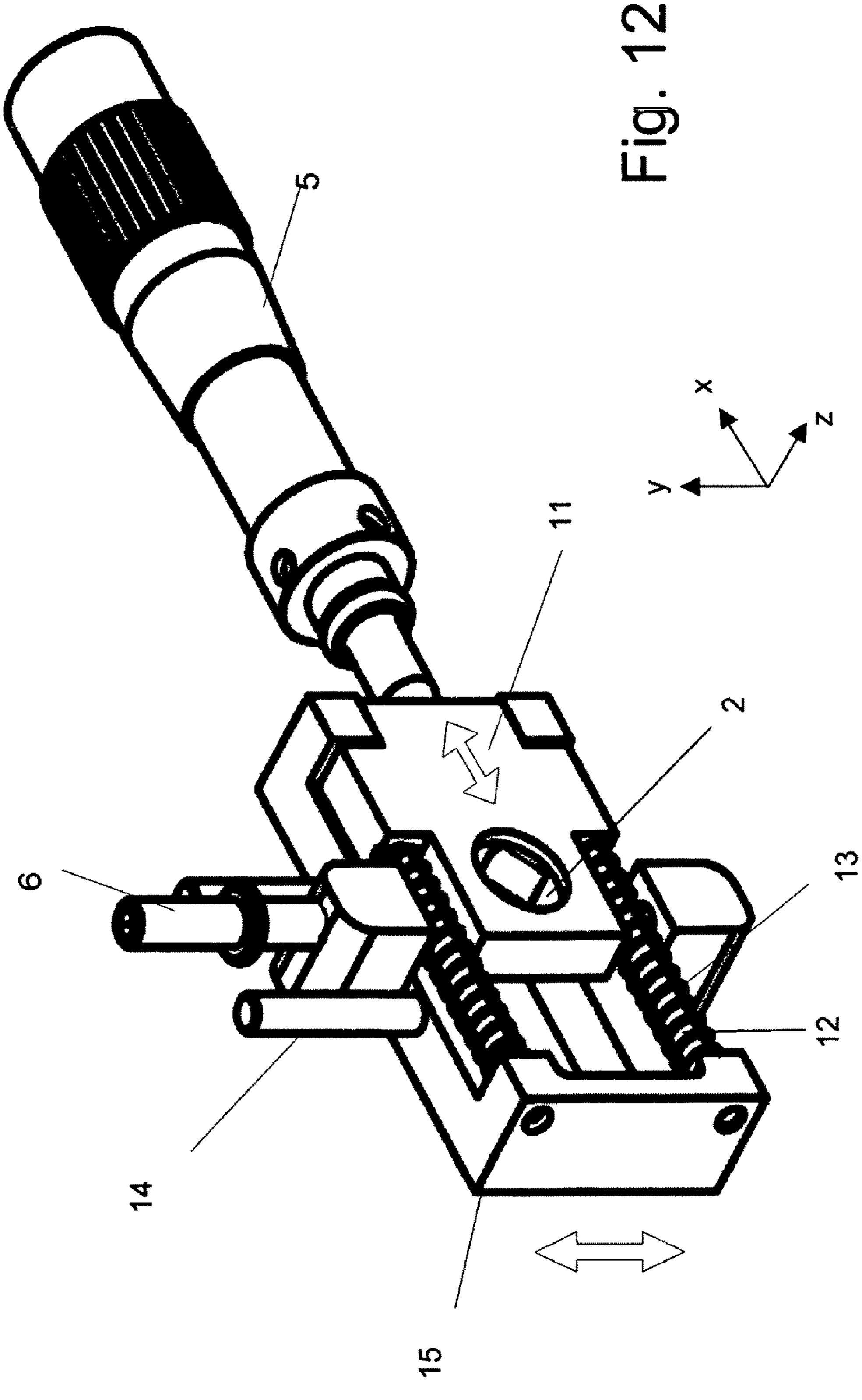
FIG. 12 shows a schematic view of the collimator mechanism of FIG. 9 without housing but with adjusting screws.

A collimator mechanism BM that is constructed on the basis of calculations (see FIGS. 9 and 10) for an inventive X-ray analysis instrument is disposed in a collimator housing 1 with optional Be-window 7 and optional vacuum connection 4, wherein the collimator mechanism BM is provided with a collimator (i.e. an aperture window 2 with aperture opening 3) and an adjustment mechanism with two actuators (in the present case a micrometer screw 5 and fine thread bolts 6). In FIGS. 9 through 14, the optics is rotated through 45 degrees such that the square beam profile and thereby also the square aperture opening 3 stand on edge. Under these circumstances, the diagonal movements of FIGS. 3 through 5 become horizontal or vertical movements. FIG. 11 shows the central adjustment mechanism with collimator receptacle (holder) 11 that has not yet been mounted in the housing. The collimator can be moved in the X direction and Y direction perpendicularly to the beam direction through two adjustments. In the illustrated embodiment, it can be adjusted in the X direction by a micrometer screw 5 and in the Y direction by a fine thread bolt 6 (see FIG. 12). The collimator is mounted in a holder 11 that is disposed on two axes 12 and is pressed against the micrometer screw 5 by means of two springs 13. This ensures automatic resetting of the collimator (or the aperture window 2) in this direction. The adjustment mechanism (see FIG. 11) is suspended via two guiding pins 14 and the fine thread bolt 6 that is rotatably disposed in the collimator housing. In this fashion, an overall frame 15 of the adjustment mechanism can be moved (see FIG. 12).

The movement of the collimator in the X and Y directions could also be realized through other adjustment mechanisms e.g. via two micrometer screws, two simple adjusting screws, elongated holes with screws etc. An embodiment with only one micrometer screw and one fine thread bolt is advantageous when the collimator is to be adjusted only once in height with respect to a square beam, standing on edge, while the adjustment for collimating out undesired beam portions is mainly performed in a horizontal direction.

Figure 14:
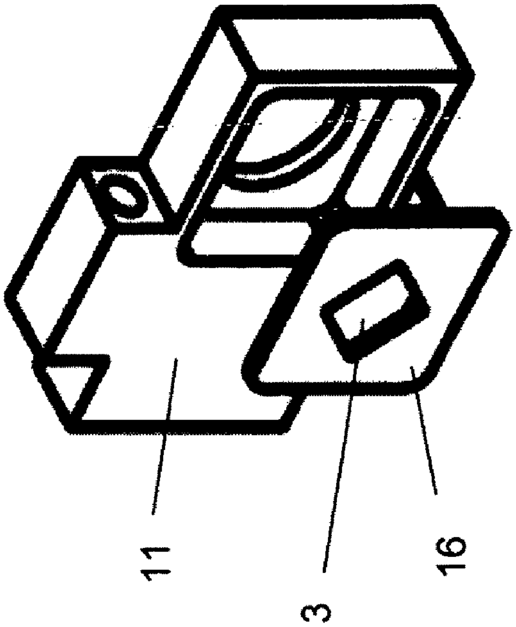
FIG. 14 shows a schematic inclined view of the holder of FIG. 13 with removed aperture window element.
Figure 13:
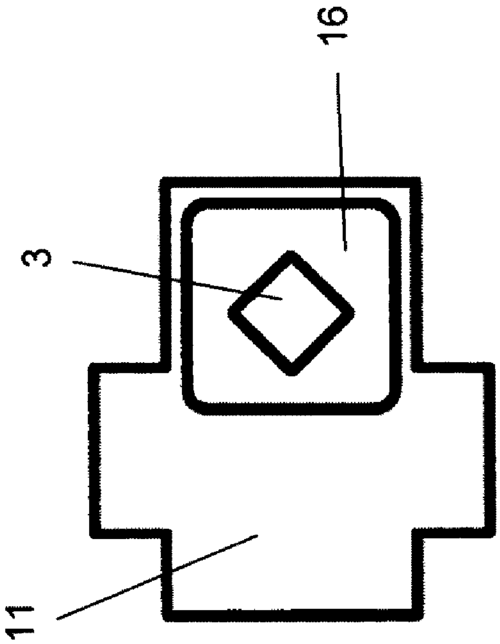
FIG. 13 shows a schematic top view of an exchangeable aperture window element in a holder (collimator receptacle) for the invention.

In order to ensure optimum collimator size and shape, the collimator may be designed to be exchangeable (see FIGS. 13 and 14). In this case, an aperture window element 16, in which the aperture opening is formed, is exchangeably held in a holder 11. FIG. 14 shows a removed aperture window element 16 in front of the associated holder 11.

Figure 15B:
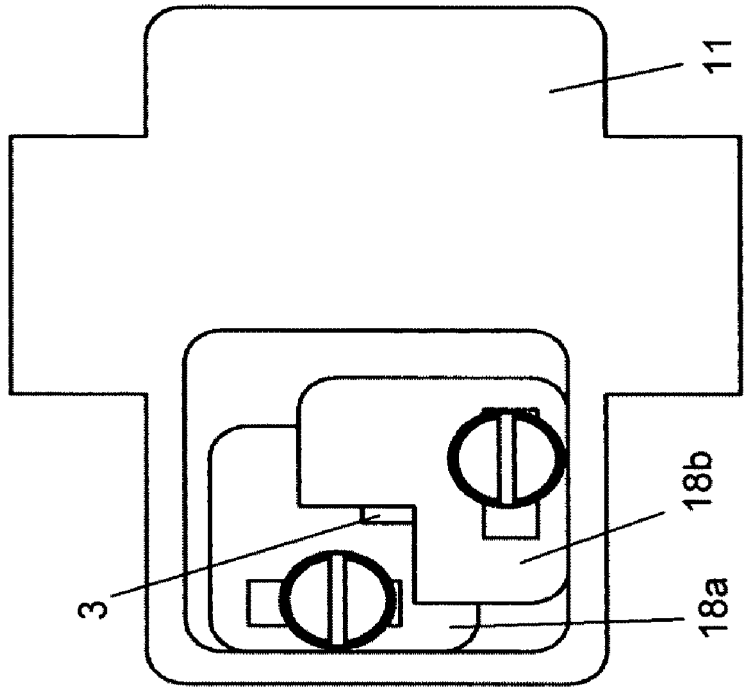
FIGS. 15*a*, 15*b* show schematic top views of a collimator mechanism with adjustable aperture opening size for the invention, with two different adjusted window sizes.
Figure 15A:
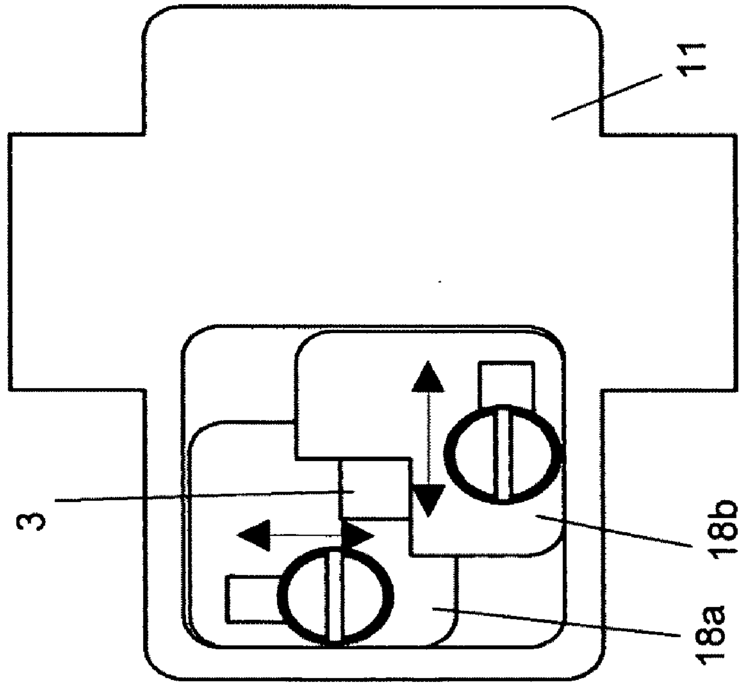

Collimators with holes (aperture openings 3) of different shapes such as rectangles, diamonds, squares or circles can be used within the scope of the present invention. One preferred structural shape utilizes a square standing on edge. One further structural type is the rectangular collimator shown in FIGS. 15*a* and 15*b*, wherein the side ratios and the size can be adjusted, in particular, with two L-shaped aperture sections 18*a*, 18*b*. A variable iris diaphragm can also be realized in this fashion.

Figure 16:
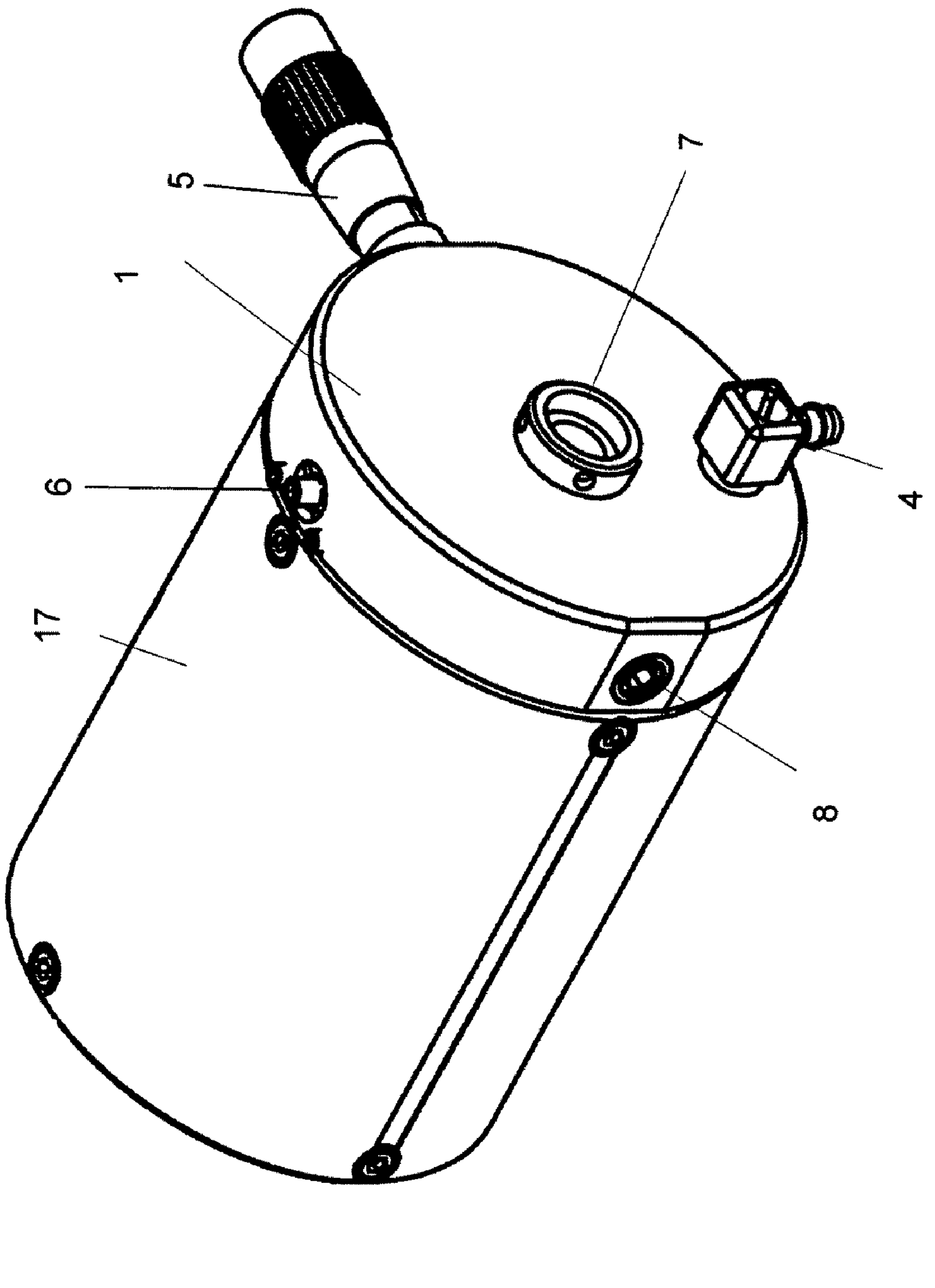
FIG. 16 shows a schematic inclined view of a component for the invention, comprising a collimator mechanism in a collimator housing, and an X-ray optics in an optical housing that is assembled with the collimator housing.

The collimator housing 1 can be mounted either in front of or behind an optical housing 17 e.g. in correspondence with DE 10 2006 015933 B3 (see FIG. 16) which can be evacuated via the vacuum connection 4 located above the collimator housing 1. In this fashion, the collimator can be operated in a vacuum or be flushed with protective gas, which prevents beam intensity loss and protects the optics from corrosion. The device is very compact. The beam then leaves the housing 1 through a beryllium window 7 located in the collimator housing 1.

The operating direction of the micrometer screw 5 can be changed by mounting the adjustment mechanism in a different orientation and mounting the micrometer screw 5 on the opposite side. In practice, this facilitates the use in left-hand and right-hand side system solutions. In order to be able to further operate the housing 1 under vacuum, the hole that is not used by the micrometer screw is provided with a blind plug 8.

Example of Application

A crystal of a defined size and known lattice constants was mounted on an X-ray diffractometer (Smart Apex-II, Bruker AXS) at a fixed separation from the source and detector. The crystal had a long cell axis that showed a tendency for reflex superpositions with the selected detector separation. The crystal was oriented in such a fashion that the closely neighboring reflexes of the long cell axis on the detector were easily recognizable.

Several scans with completely opened aperture were performed and evaluated as a reference measurement. The overall flux of the source with opened aperture was measured with a photo diode and recorded. Then, the scans were repeated on the same crystal with the collimator being adjusted to half flux, and evaluated in the same fashion. The aperture was initially used to collimate out to half the flux in the direction of movement A (setting 1). The evaluation of the measured scans showed that the average normalized diffracted intensity was reduced to 33%. The ratio between signal and background was reduced to just under 60%. Then, the aperture was used to collimate out to half the flux in the direction of movement B (setting 2). The evaluation of the scans showed that the average normalized diffracted intensity with setting 2 was reduced to 45% and the ratio between signal and background to 74%. Setting 2 therefore yielded better results than setting 1.

By moving the collimator to positions with reduced flux, reflex separation was advantageously further improved. The evaluation included more reflexes compared to completely opened collimator as is shown in table 1. This result coincided in terms of quality with the predictions of the ray tracing calculations which did not contain any sample-specific properties such as the mosaicity of the crystal. The effect of improved reflex separation is indeed not dramatic in this example of application, but becomes greater with reduced detector separation or with samples having even longer cell axes, for determining the structure.

In total, setting 2 (direction of movement B) yielded better results in contrast to prior art according to U.S. Pat. No. 7,245,699 B2. In accordance with a device of U.S. Pat. No. 7,245,699 B2, this beam portion is not accessible. The beam portion that is described as being less efficient in accordance with U.S. Pat. No. 7,245,699 B2 obviously surprisingly yields a better signal-to-noise ratio.

TABLE 1

| | Aperture setting | | |
|---|---|---|---|
| | Open | Setting 1 | Setting 2 |
| Relative flux | 1 | 0.49 | 0.48 |
| # data | 32051 | 32421 | 32411 |
| Resolution range | | 31.67-1.61 A | |
| Mean norm I (mean normalized intensity) | 418.6 | 135.9 | 187.2 |
| Mean I/sig (mean signal-to-background ratio) | 22.6 | 14.2 | 16.8 |

Figure 17A:
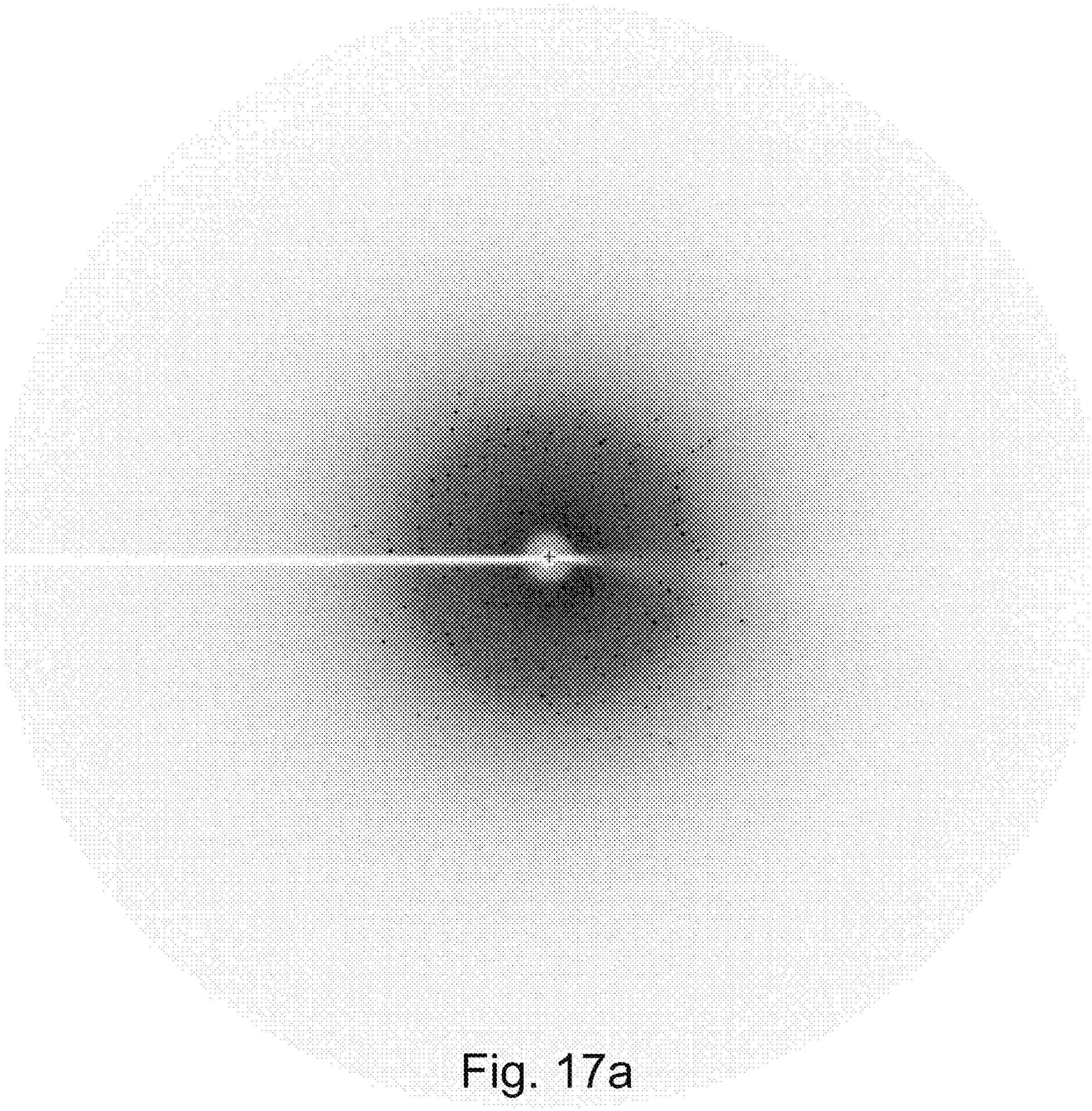
FIGS. 17*a*-17*b* show experimentally determined diffraction patterns of a small thaumatin crystal with a beam having a focus size of 0.25 mm at the location of the sample (FIG. 17*a*) and with a beam having a focus size of 0.12 mm at the location of the sample, which is reduced in accordance with the invention (FIG. 17*b*)
Figure 17B:
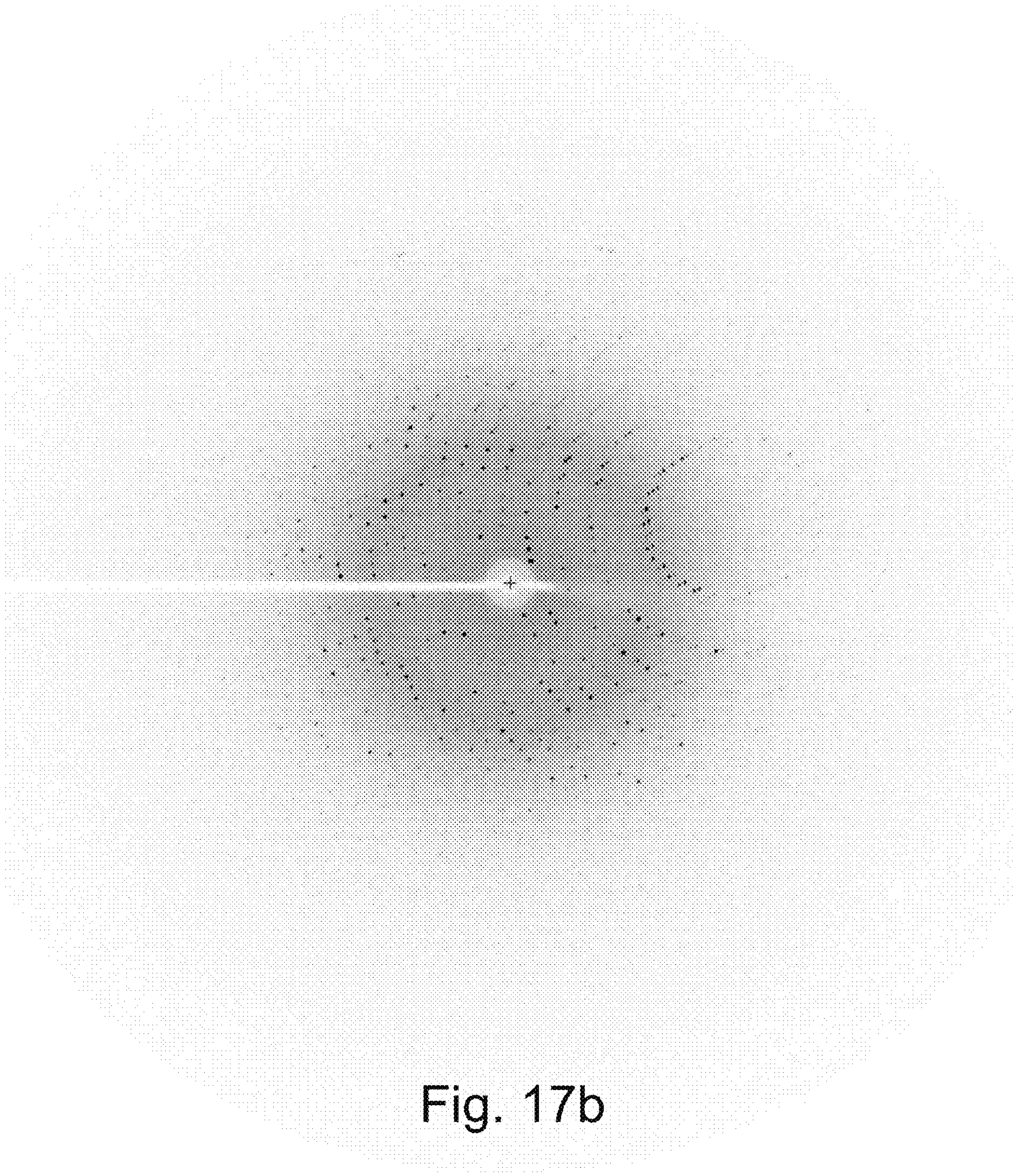

FIGS. 17*a* and 17*b* show two diffraction patterns on a small thaumatin crystal, one with a beam having a size of approximately 0.25 mm (FIG. 17*a*) and one with a beam having a size of approximately 0.12 mm (FIG. 17*b*). Although the photon flux of the small beam was only a fraction of the overall flux, the resulting diffraction pattern was considerably improved, i.e. the data were considerably improved. This is mainly due to the fact that the smaller beam substantially only impinges on the sample whereas the larger beam additionally impinges on a part of the sample holder and the surrounding air and causes scattering. This scattering increases the background that covers the diffraction reflexes.

Such a change of the focus size previously required a change of the optics. This is now realized by the inventive collimator mechanism in a very simple and inexpensive fashion without changing the optics. In accordance with U.S. Pat. No. 7,245,699 B2, only the path of movement B is possible which always results in beam enlargement. This is, however, unfavorable for small samples as is shown in the experimental results of FIGS. 17*a* and 17*b*.

Figure 18A:
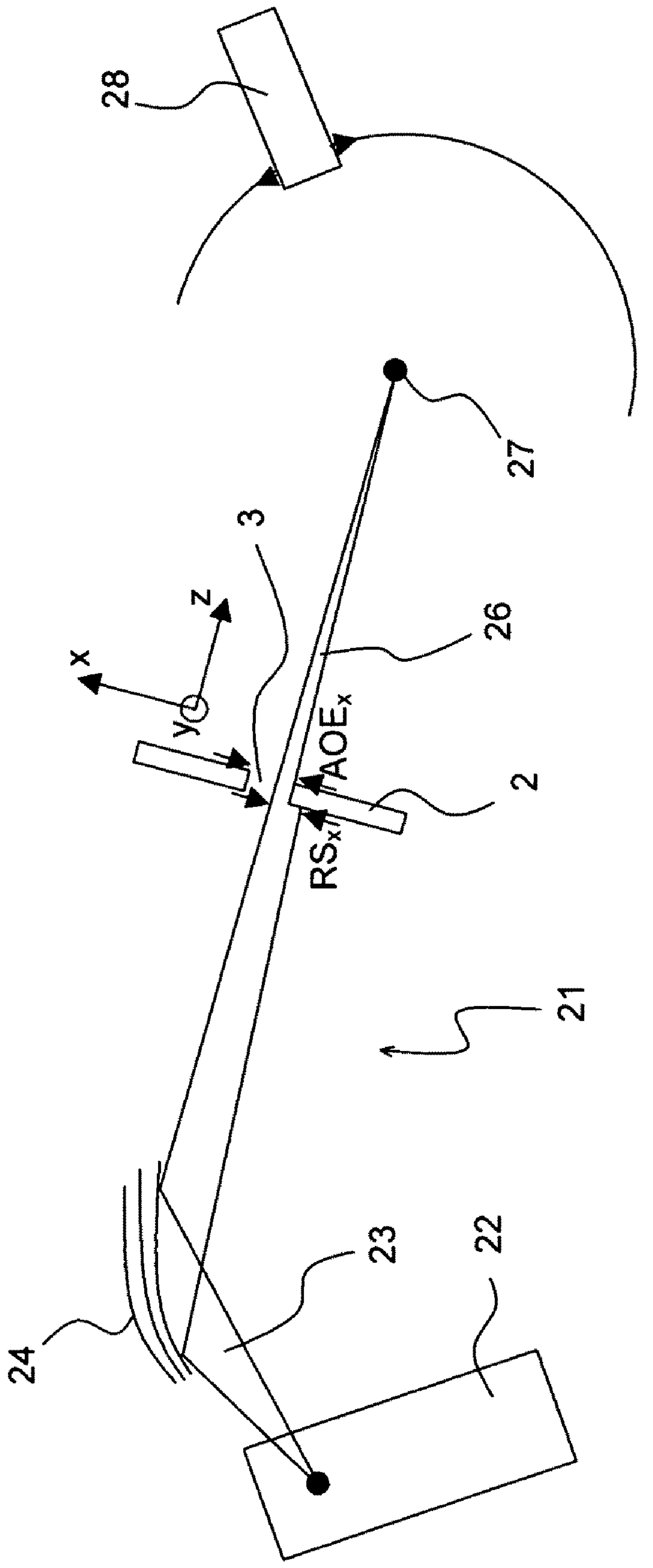
FIG. 18*a* shows a schematic view of an inventive X-ray analysis instrument.

FIG. 18*a* schematically shows an inventive X-ray analysis instrument, in the present case an X-ray diffractometer 21. An X-ray beam 23 is emitted from an X-ray source 22, which is reflected and thereby focused by an X-ray optics 24, in the present case a Goebel mirror. An aperture window 2 with an aperture opening 3 is disposed in the X-ray beam 23 on the output side of the Goebel mirror. The aperture window 2 is part of a collimator mechanism and can be gradually moved perpendicularly to the direction of propagation of the X-ray beam 23 in two independent directions x and y. It should be noted that the y direction extends perpendicularly to the plane of the drawing, and the z direction extends parallel to the direction of propagation of the X-ray radiation in the area of the aperture window 2. The collimator mechanism has means for gradual movement of the aperture window 2, which are not shown in detail, e.g. a micrometer screw or a fine thread bolt.

The X-ray beam 23 has an extension $RS_x$ in the x direction at the location (with respect to the z direction) of the aperture window 2, and the aperture opening 2 has an extension $AOE_x$ in the x direction. In accordance with the invention $RS_x <= AOE_x$ (in the illustrated embodiment $RS_x$ is slightly smaller than $AOE_x$). The same applies for the corresponding values in the y direction.

In the illustrated situation, the aperture window 2 is used to permit passage of a first partial area of the X-ray 23, i.e. in FIG. 18 an upper partial area of the X-ray beam 23, through the aperture opening 3 (see transmitted X-ray partial beam or portion 26) and to collimate a second partial area (lower part in FIG. 18*a*) of the X-ray beam 23. X-ray radiation does thereby not pass through an upper part of the aperture opening 3. The transmitted partial beam 26 was reflected on the X-ray optics 24 on an area of the X-ray optics 24 that is further away from the X-ray source 22 and located on the right-hand side in FIG. 18*a*, and is therefore called a portion of the X-ray beam 23 that is remote from the source. The shaded lower partial area of the X-ray beam 23, however, was reflected on an area of the X-ray optics 24 (on the left-hand side in FIG. 18*a*) that is located closer to the X-ray source 1 and is therefore called close to the source. It should be noted that in the illustrated case, it would be sufficient to be able to adjust the aperture window 2 only in the x direction in order to select a portion of the X-ray beam 23 that is remote from or close to the source. In one variant of the illustrated embodiment, the aperture window 2 need not be adjustable in the y direction such that the aperture window 2 can only be moved in one direction, i.e. the x direction, transversely to the direction of propagation (in the present case the z direction) of the X-ray beam 23.

Only the partial beam 26 reaches the sample 27 to interact with it. The radiation that was diffracted by the sample 27 can be detected by means of a detector 28. In the present case, the detector 28 can be moved around the sample 27 along a circular arc.

Figure 18B:
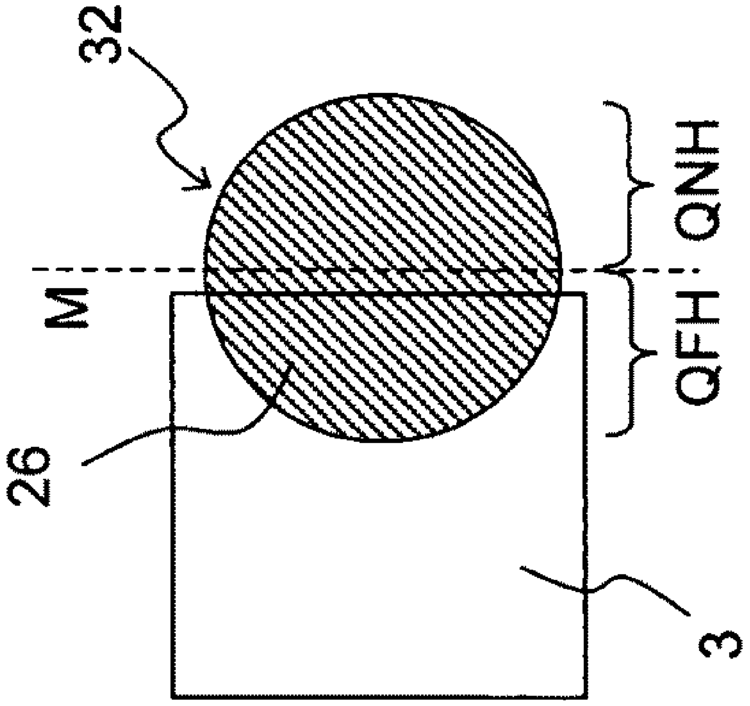
FIG. 18*b* shows a schematic cross-sectional view of FIG. 18*a* perpendicularly to the beam propagation direction at the location of the aperture window.

FIG. 18*b* shows the relationships in the cross-section 32 of the X-ray beam at the location (i.e. the z position) of the aperture window of FIG. 18*a* in more detail. The substantially circular cross-section 32 is divided by the center line M into two parts (or halves) QNH, QFH having the same area. The right-hand part QNH in FIG. 18*b* ("the half close to the source") was reflected on the X-ray optics at a location closer to the source than the left-hand part QFH in FIG. 18*b* ("the half remote from the source"). A partial beam 26 is selected by means of the aperture opening 3 through overlapping with the cross-section 32 of the X-ray beam. In order to select a partial beam (portion) 26 remote from the source, the aperture opening 3 is thereby maximally advanced to the center line M. In FIG. 18*b*, the aperture opening 3 is not completely advanced to the center line M.

In FIGS. 18*a*, 18*b*, an inventive X-ray analysis instrument is used to select a portion of an X-ray beam that is remote from the source, thereby improving reflex separation and the signal-to-background ratios. An inventive X-ray analysis instrument, however, also permits selection of any other portions of the X-ray beam, e.g. a portion close to the source, depending on the requirements of the respective X-ray experiment. Moreover, in accordance with the invention, a portion of the X-ray beam that is remote from the source can also be selected with a conventional collimator, in particular a collimator which has a smaller size than the beam cross-section, or can be moved by a distance that is shorter than twice the beam extension.

Figure 19C:
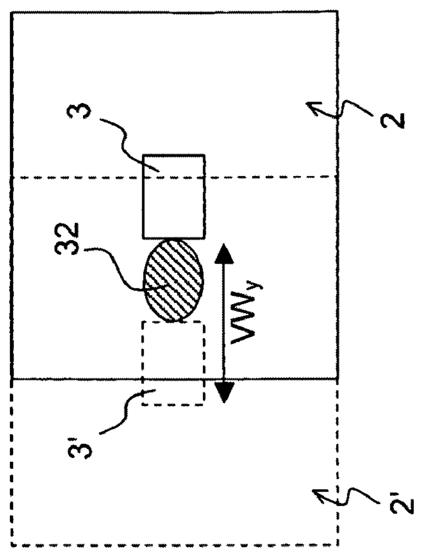
FIGS. 19*a*-19*c* show schematic views of different positions of movement of an aperture window relative to an X-ray beam for illustrating the inventive paths of movement of the aperture window.
Figure 19B:
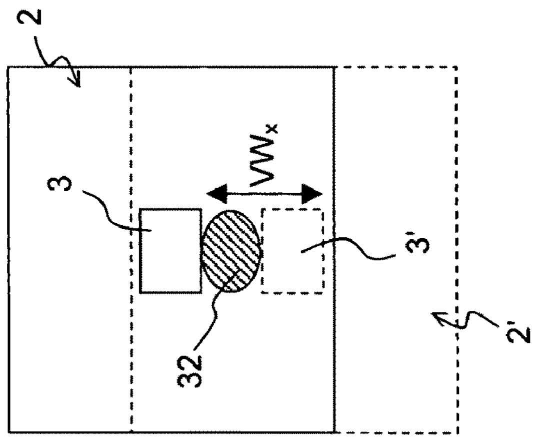
Figure 19A:
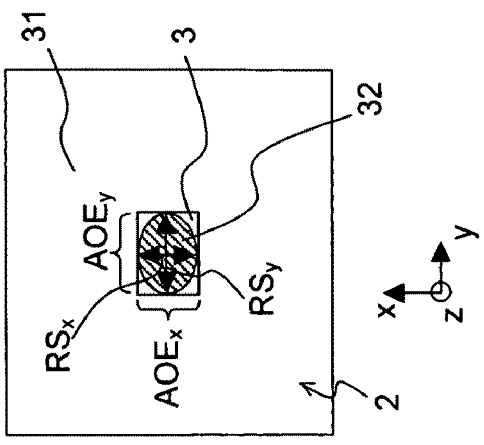

FIGS. 19*a* through 19*c* illustrate the inventive movability of an aperture window 2 in a plane perpendicular to the direction of propagation (in the present case the z direction) of an X-ray beam, typically on the output side of (behind) a multi-layer X-ray optics. In the illustrated example, the aperture window 2 can be moved in two independent (in the present case also orthogonal) directions x and y in each case over a path of movement that corresponds to twice the extension of the X-ray beam cross-section in the respective direction. In accordance with the invention, only one direction of movement may be provided (e.g. only the illustrated possible movement in the x direction), or the movability in a second direction (e.g. the y direction) can be reduced to a path of movement that is smaller than twice the extension of the X-ray beam in the second direction and only be used for fine adjustment of the aperture window.

FIG. 19*a* initially shows a completely opened (centered) position of movement of the aperture window 2. The aperture window 2 comprises a collimating frame 31 and (in the present case) a rectangular aperture opening 3. The aperture opening 3 has the extension $AOE_x$ in the x direction and the extension $AOE_y$ in the y direction. In the illustrated embodiment, the X-ray beam has an oval cross-section 32 with an extension $RS_x$ in the x direction and $RS_y$ in the y direction at the location of the aperture window 2 (non-shaded).

In accordance with the present invention, the aperture opening 3 is at least as large as the cross-section 32 of the X-ray beam, i.e. the cross-section 32 of the X-ray beam is (in the completely opened position) completely within the aperture opening 3. In the illustrated embodiment, the following exactly applies: $RS_x = AOE_x$ and $RS_y = AOE_y$. In accordance with the invention, $RS_x < AOE_x$ and/or $RS_y < AOE_y$ may also be established.

FIG. 19*b* illustrates the movability of the aperture window 2 in the x direction. The aperture window 2 can be shifted in the positive x direction at least to such an extent that the aperture opening 3 just ceases to overlap the cross-section 32 of the X-ray beam. The same applies in the negative x direction (see dashed aperture window 2' with aperture opening 3'). Towards this end, the path of movement $VW_x$ of the aperture window 2 (illustrated for the lower edge of the aperture opening 3) in the x direction in the illustrated embodiment is at least twice as large as the extension $RS_x$ of the X-ray beam in the x direction. With $RS_x < AOE_x$, a path of movement $VW_x >= RS_x + AOE_x$ must be established in order to be able to move the aperture window 2 out of the X-ray beam both in the positive and negative x direction in accordance with the invention.

FIG. 19*c* shows the movability of the aperture window 2 in the y direction. The aperture window 2 can be moved again in the positive y direction at least to such an extent that the aperture opening 3 just ceases to overlap the cross-section 32 of the X-ray beam. The same applies in the negative y direction (see dashed aperture window 2' with aperture opening 3'). Towards this end, the path of movement $VW_y$ of the aperture window 2 (illustrated for the left-hand edge of the aperture opening 3) in the y direction in the illustrated embodiment is at least twice as large as the extension $RS_y$ of the X-ray beam in the y direction. In case of $RS_y<AOE_y$, a path of movement $VW_y>=RS_y+AOE_y$ must be provided in order to be able to move the aperture window 2 out of the X-ray beam both in the positive and negative y direction in accordance with the invention.

Since the aperture opening 3 can at least be moved just out of the cross-section 32 of the X-ray beam in the two independent spatial directions x and y, an edge partial area of the cross-section 32 can be selected from each direction of approach for overlapping with the aperture opening 3 and be supplied to a subsequent X-ray experiment. The remaining partial area of the cross-section 32 is then blocked by the collimating frame 31. The area portion of the selected partial area can be gradually selected due to the gradual movability of the aperture window 2 in both directions x and y, in particular, in order to optimize the photon flux, photon flux density and/or beam divergence in the subsequent X-ray analysis experiment. The overall X-ray beam can additionally be passed to the subsequent experiment in the completely opened position of movement of the aperture window 2. The size of the aperture opening of the aperture window can optionally also be adjusted by the collimator mechanism, in particular reduced, preferably gradually reduced such that non-edge partial areas of the cross-section of the X-ray can also be selected (see in this connection also FIGS. 15*a* and 15*b*).

The present invention provides optimum freedom for the selection of a partial area of an X-ray beam cross-section for an X-ray analysis experiment.

We claim:

1. An X-ray analysis instrument or an X-ray diffractometer, comprising:

an X-ray source that emits an X-ray beam;

an X-ray optics or a multi-layer X-ray mirror;

a collimator mechanism, said collimator mechanism defining an aperture window having an aperture opening through which at least part of the X-ray beam passes, said aperture opening being at least as large as a cross-section of the X-ray beam at a location of said aperture window; and means for gradual movement of the aperture window in at least one direction transversely to the X-ray beam, wherein a path of movement of said aperture window by said gradual movement means in said at least one direction is at least twice as large as an extension of the X-ray beam in that direction at said location of said aperture window.

2. The X-ray analysis instrument of claim 1, wherein the collimator mechanism comprises means for gradual movement of the aperture window in two independent directions transversely to the X-ray beam, a respective path of movement of said aperture window which is accessible by said collimator mechanism in each of said independent directions being at least twice as large as an extension of the X-ray beam at said location of the aperture window in a respective said independent direction.

3. The X-ray analysis instrument of claim 1, wherein a size of said aperture opening cannot be adjusted.

4. The X-ray analysis instrument of claim 1, wherein a size of said aperture opening can be adjusted by means of said collimator mechanism, wherein said aperture opening can be adjusted to a size which is at least as large as said cross-section of the X-ray beam at said location of said aperture window.

5. The X-ray analysis instrument of claim 4, wherein said collimator mechanism for adjusting said size of said aperture opening has two L-shaped aperture sections that can be moved with respect to one another.

6. The X-ray analysis instrument of claim 1, wherein said collimator mechanism is disposed on an output side of said X-ray optics.

7. The X-ray analysis instrument of claim 1, wherein said aperture window has a square aperture opening, the X-ray beam having an approximately square cross-section at said location of said aperture window, wherein side edges of said square aperture opening and said square cross-section of the X-ray beam are oriented parallel to each other and said at least one direction in which said aperture window can be moved is oriented along a diagonal of said square aperture opening.

8. The X-ray analysis instrument of claim 1, wherein said X-ray optics is disposed in a gas-tight optical housing and said collimator mechanism is disposed in a gas-tight collimator housing, wherein said optical housing and said collimator housing are evacuated or flooded with a protective gas.

9. The X-ray analysis instrument of claim 1, wherein said X-ray optics and said collimator mechanism are disposed in a common gas-tight housing, wherein said common housing is evacuated or flooded with a protective gas.

10. The X-ray analysis instrument of claim 1, wherein said means for gradual movement of said aperture window comprise at least one micrometer screw and/or at least one fine thread bolt.

11. The X-ray analysis instrument of claim 1, wherein said collimator mechanism has a holder for an exchangeable aperture window element and said holder can be moved by said means for gradual movement of the aperture window.

12. A method for operating the X-ray analysis instrument of claim 1, wherein the X-ray beam is emitted by the X-ray source to be imaged on a sample through the X-ray optics, the method comprising the step of:

selecting a portion of the X-ray beam on the X-ray optics that is remote from the source for adjusting or reducing a focus size of the X-ray beam at the location of the sample by means of the aperture opening of the aperture window.

13. The method of claim 12, wherein the focus size of the X-ray beam at the location of the sample is adjusted to a size of the sample.

14. The method of claim 12, wherein the selected portion of the X-ray beam remote from the source has a below-average mean photon flux density compared to a remaining portion of the X-ray beam.

15. The method of claim 12, wherein the aperture window is positioned in such a fashion that X-ray radiation does not pass through a part of the aperture opening of the aperture window.

16. The method of claim 12, wherein the aperture window is disposed in the X-ray beam between the X-ray optics and the sample.

* * * * *